United States Patent
Brunk et al.

(10) Patent No.: US 12,299,764 B2
(45) Date of Patent: May 13, 2025

(54) PRE-PRESS WARPING ARRANGEMENTS FOR WATERMARKS AND ASSOCIATED GRAPHIC ARTWORKS, WITH RELATED QUALITY CONTROL TECHNIQUES

(71) Applicant: Digimarc Corporation, Beaverton, OR (US)

(72) Inventors: Hugh L. Brunk, Portland, OR (US); Kristyn R. Falkenstern, Portland, OR (US); Vojtech Holub, Lafayette, CO (US)

(73) Assignee: Digimarc Corporation, Beaverton, OR (US)

( * ) Notice: Subject to any disclaimer, the term of this patent is extended or adjusted under 35 U.S.C. 154(b) by 326 days.

(21) Appl. No.: 17/713,584

(22) Filed: Apr. 5, 2022

(65) Prior Publication Data

US 2022/0292625 A1    Sep. 15, 2022

Related U.S. Application Data

(63) Continuation-in-part of application No. 17/214,455, filed on Mar. 26, 2021, now Pat. No. 11,741,733.

(60) Provisional application No. 63/173,142, filed on Apr. 9, 2021, provisional application No. 63/011,195, filed on Apr. 16, 2020.

(51) Int. Cl.
   *G06T 1/00*    (2006.01)
   *G06T 3/18*    (2024.01)
   *H04N 1/32*    (2006.01)

(52) U.S. Cl.
   CPC .............. *G06T 1/0028* (2013.01); *G06T 3/18* (2024.01); *H04N 1/32267* (2013.01)

(58) Field of Classification Search
   CPC ...... G06T 1/0028; G06T 3/18; H04N 1/32267
   USPC ........................................................ 382/153
   See application file for complete search history.

(56) References Cited

U.S. PATENT DOCUMENTS

| | | | |
|---|---|---|---|
| 6,947,571 B1 | 9/2005 | Rhoads | |
| 8,477,990 B2 | 7/2013 | Reed | |
| 9,129,277 B2 | 9/2015 | Macintosh | |
| 9,681,020 B2 * | 6/2017 | Göktekin | H04N 1/32309 |
| 2002/0146120 A1 * | 10/2002 | Anglin | G06T 1/0028 |
| | | | 380/54 |
| 2004/0153649 A1 * | 8/2004 | Rhoads | G07D 7/0034 |
| | | | 707/E17.112 |
| 2008/0019029 A1 * | 1/2008 | Raymond | G02B 27/10 |
| | | | 53/442 |
| 2016/0210621 A1 * | 7/2016 | Khan | G06T 1/0028 |
| 2018/0352111 A1 | 12/2018 | Bai | |
| 2019/0306385 A1 | 10/2019 | Sharma | |
| 2021/0314459 A1 | 10/2021 | Chadwick | |
| 2021/0368061 A1 | 11/2021 | Holub | |
| 2022/0012840 A1 | 1/2022 | Falkenstern | |

\* cited by examiner

*Primary Examiner* — Ali Bayat
(74) *Attorney, Agent, or Firm* — Klarquist Sparkman, LLP

(57) ABSTRACT

Consumer product labels sometime include 2D machine readable codes, such as digital watermark patterns. When such label artwork is printed on a plastic sleeve that is then heat-shrunk to conform to a plastic container, the code can become distorted and unreadable. Various techniques are detailed to cope with this problem. Additionally, methods are disclosed to assess—before a heat-shrink label is applied to a product—the expected final readability of any machine readable code included in the label artwork. A variety of other features and arrangements are also detailed.

7 Claims, 17 Drawing Sheets

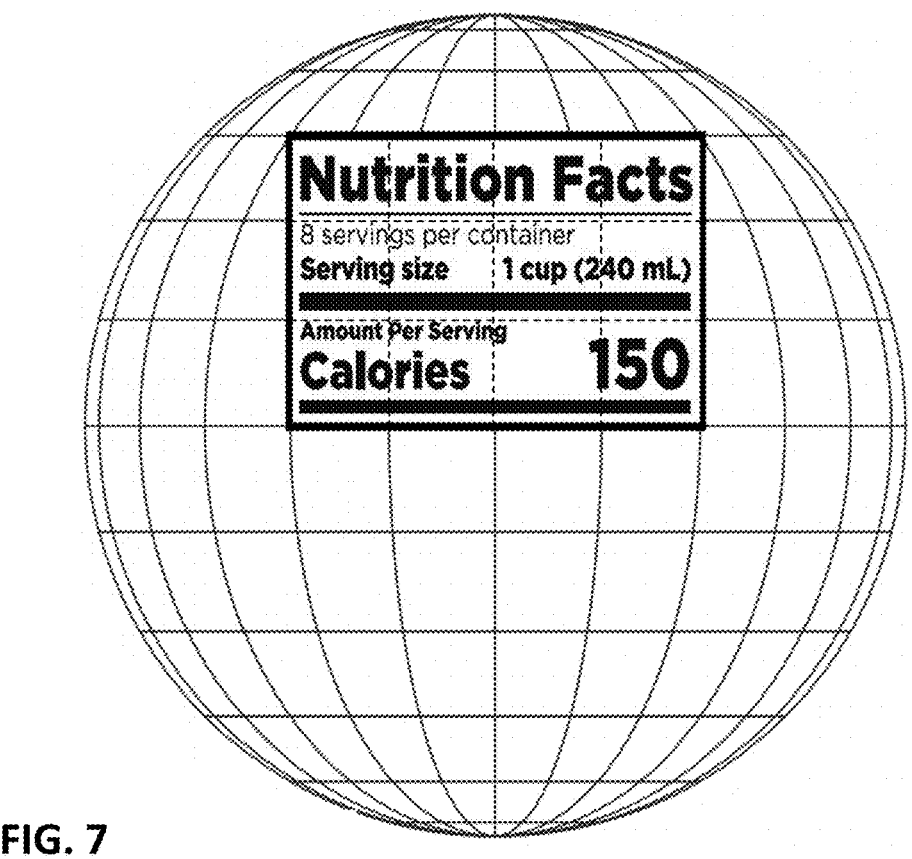
FIG. 7
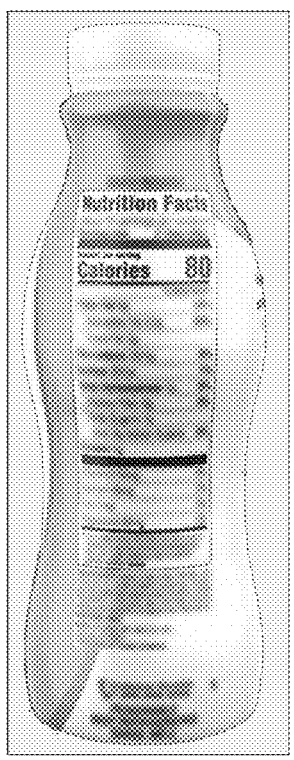
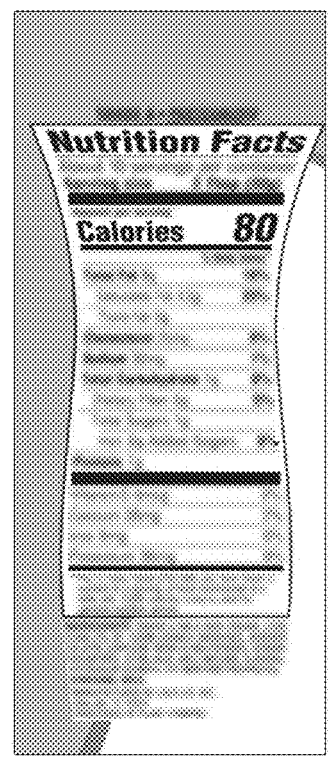
FIG. 8A
Prior Art
FIG. 8B
Prior Art

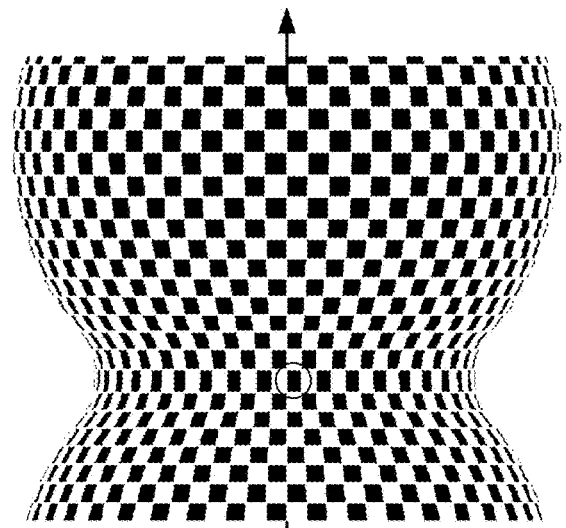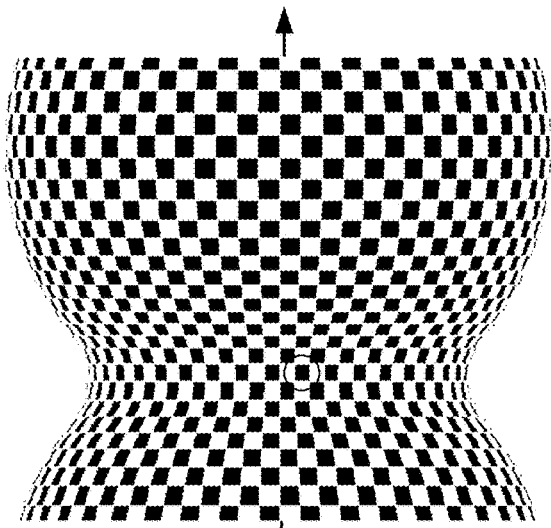
FIG. 13A  FIG. 13B
FIG. 12
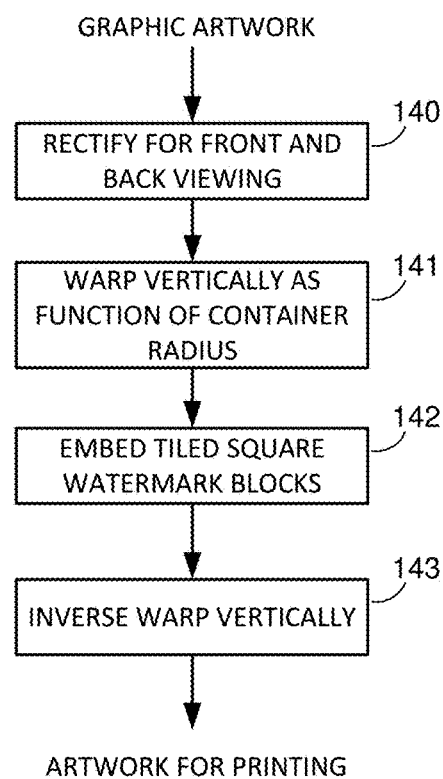
FIG. 14

PRE-PRESS WARPING ARRANGEMENTS FOR WATERMARKS AND ASSOCIATED GRAPHIC ARTWORKS, WITH RELATED QUALITY CONTROL TECHNIQUES

RELATED APPLICATION DATA

This application claims priority to application 63/173,142, filed Apr. 9, 2021. This application is also a continuation-in-part of application Ser. No. 17/214,455, filed Mar. 26, 2021 (now published as 20210299706), which claims priority to application 63/011,195, filed Apr. 16, 2020. These applications are incorporated herein by reference.

TECHNICAL FIELD

The present application concerns warping of patterns formed on 3D objects, including cups, bottles and other containers.

BACKGROUND AND INTRODUCTION

Containers for consumer goods come in a variety of 3D configurations. Sometimes labels for such items are printed on a rectangular sheet of plastic material, which is then formed into a cylindrical sleeve by bonding the two side edges to each other. This sleeve is slipped over the top of the container and heat-shrunk to conform the plastic label to the shape of the container.

Visual graphic artwork for such labels is sometimes pre-distorted, or warped, in anticipation of the heat-shrinking to follow. Applicant has found that such warping can degrade readability of any digital watermark pattern included in the label artwork, and has devised techniques to avoid such degradation and in fact improve watermark readability by applying a different warp to the watermark pattern.

Such methods and arrangements, and others, are described in the following detailed description, which proceeds with reference to the accompanying drawings.

BRIEF DESCRIPTION OF THE DRAWINGS

FIG. 7 shows the label artwork of FIG. 6 shrunk to the surface of a sphere, yielding an apparently rectangular shape with vertical text glyphs.

FIG. 8A shows a milk bottle in which the Nutrition Facts artwork is warped so as to appear generally rectangular when viewed by a consumer, despite the non-cylindrical shape of the container.

FIG. 8B shows an excerpt of the artwork printed on the label substrate for the FIG. 8A bottle, prior to shrinking.

FIG. 12 shows the profile of a non-cylindrical bottle.

FIG. 13A shows that elements of checkerboard pattern (akin to a watermark pattern, i.e., composed of square elements yielding a square block), along the viewpoint meridian, become increasingly distorted as they shrink to conform to a smaller diameter, compressing the elements horizontally.

FIG. 13B shows that a pre-warped checkerboard pattern, when shrink-fit to the shape of FIG. 13A, yields elements having square appearances at the most-shrunk part of the label surface, as well as at the least-shrunk part of the label surface.

FIG. 14 is a flowchart of a process incorporating certain aspects of the detailed technology.

DETAILED DESCRIPTION

As noted, graphic components of label artwork are sometimes pre-distorted so that, when distorted by thermal shrinking, the artwork has a desired appearance. A nutritional information panel on a drink bottle, for example, typically should have a rectangular appearance to the consumer—despite any bulges in the container configuration. Similarly, vertical and horizontal strokes of text characters in the nutritional panel should be parallel to the vertical and horizontal edges of the rectangular panel outline. Such appearance attributes can be achieved by appropriate pre-distortion of the graphic artwork.

An exemplary pre-distortion process is described with reference to FIGS. 1-7, which involve a spherical shape. This is a proxy for a non-cylindrical container to which a sleeved label may be shrink-fit—being variously wider and narrower at different locations along a central vertical axis.

Figure 1:
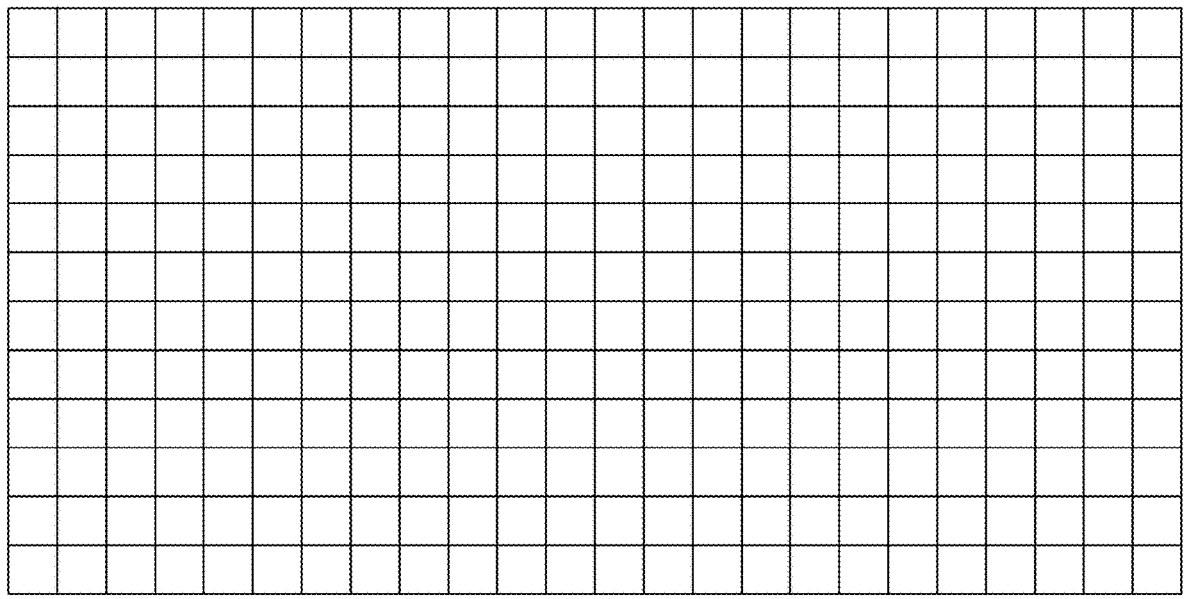
FIG. 1 shows a rectangular sheet marked with equally-spaced lines, defining areas of equal areas.
Figure 2:
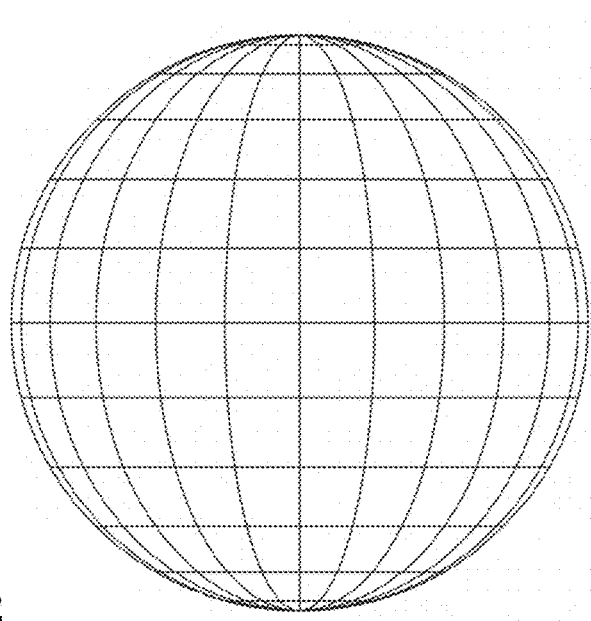
FIG. 2 conceptually illustrates shrinkage of the FIG. 1 sheet around a sphere.

FIG. 1 shows a rectangular sheet marked with a square grid. FIG. 2 shows the sheet of FIG. 1 formed first into a vertical cylinder by wrapping so the left and right edges form a seam, and then shrink-fit to a 3D sphere shape. (In actual practice, shrink-fitting of label plastics wouldn't completely cover a sphere.)

Viewed from the equatorial plane, the horizontal lines on the sphere (which may be regarded as latitude lines) appear straight. The vertical lines (which may be regarded as longitude lines) appear curved. The one exception is the longitude line closest to the viewer, which appears straight. This may be called the viewpoint meridian. The viewpoint is assumed to be on a line between the center of the 3D shape, and the point at which the viewpoint meridian crosses the equator latitude.

This mapping of a sheet to a sphere changes the uniformly-sized square regions of FIG. 1 into a multitude of differently-sized regions, each with two curved sides and two straight sides. That is, none of the regions is square. Their areas become progressively smaller further from the equator. If a product designer wishes a graphic to appear, from the viewpoint, as a rectangle with four straight edges (two horizontal and two vertical) when presented on such a sphere, the graphic must be distorted to counteract this "physical area distortion" introduced by mapping a planar sheet to a curved surface. That is, the graphic must be stretched ("warped") to counteract the diminution in areas of each "square" away from the equator.

(The 3D surface of a sphere is not "isometric" to a plane, so there is no mapping of a sheet to a sphere that preserves areas, shapes and bearings. This is in contrast to, e.g., a cylinder, which can be wrapped by a sheet while preserving areas, shapes and bearings.)

Figure 3:
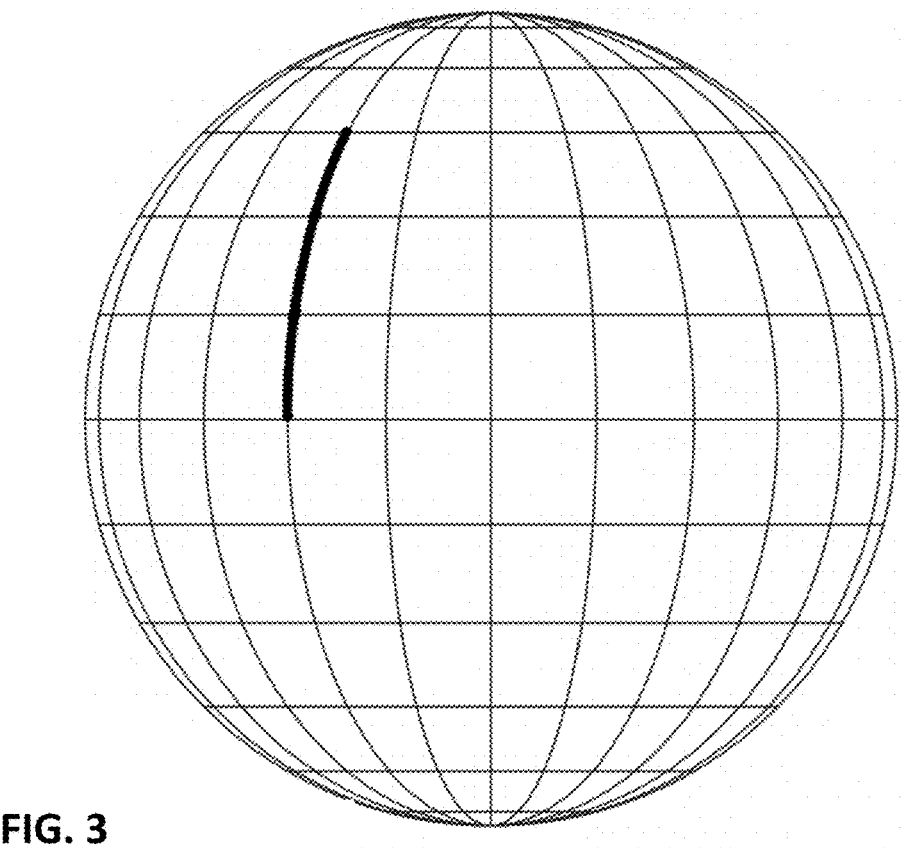
FIG. 3 is FIG. 2 with a section of longitude line highlighted to indicate curvature.
Figure 4:
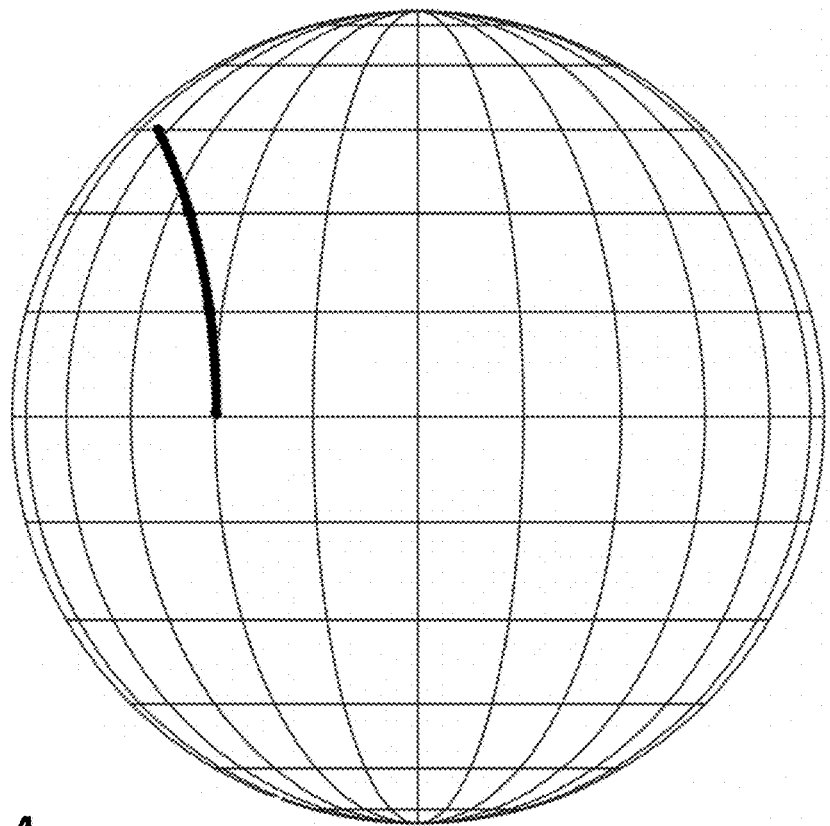
FIG. 4 shows the highlighted section of the longitude line in FIG. 3 flipped horizontally, indicating a warp for making an apparently-vertical line.
Figure 5:
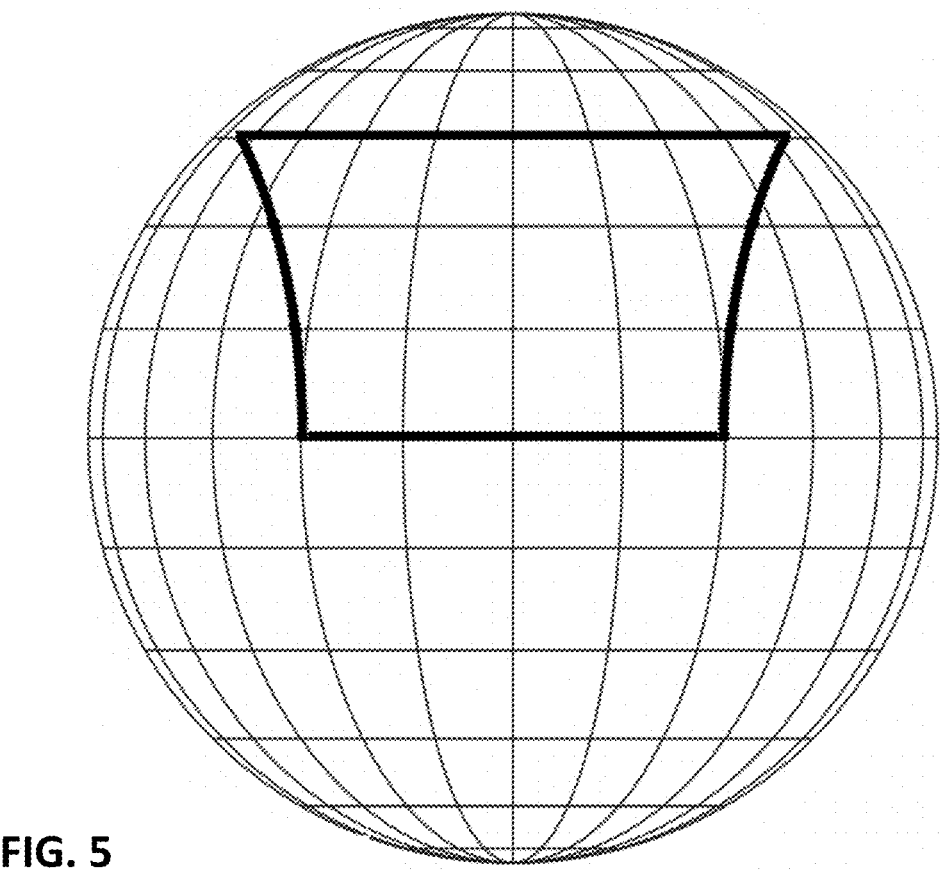
FIG. 5 depicts a bolded shape in 2D which, when shrunk to a sphere, will have a generally rectangular appearance.
Figure 6:
FIG. 6 shows part of 2D label artwork warped using the shape shown in FIG. 5.

FIG. 3 shows, in dark, one of the longitude lines whose curvature gives rise to the physical area distortion, and which must be counteracted if the equal-area appearance of the blocks on the flat sheet is to be maintained when mapped to the curved sphere surface. FIG. 4 shows how the curvature of the dark longitude line in FIG. 3 can be counteracted by flipping horizontally. FIG. 5 shows a warped 2D shape that, if shrink-fit to the 3D sphere, will appear to be a straight-edged rectangle to a viewer at the viewpoint. FIG. 6 shows an example of label artwork that is warped per the 2D shape of FIG. 5.

FIG. 7 shows the artwork of FIG. 6, shrink-fit to the sphere, as it appears from the viewpoint. Note that lines which should be vertical (e.g., the vertical lines of the "N") appear vertical in FIG. 7, unlike their warped appearance in FIG. 6. Similarly, the areas of the squares in the flat sheet of FIG. 1 appear preserved in the appearance of the FIG. 7 graphic. (The square areas are shown by fine dashed lines.) We term the just-described process "rectification" of the artwork for a particular viewpoint distortion, and it has the property of appearing to preserve areas (making it appear "equiareal").

The example just-given is simple, but the basic principles can be applied to warp artwork for any shape container. FIG. 8A shows a more complexly-shaped milk bottle, with a shrink-fit printed sleeve. The Nutrition Facts panel is warped for printing so as to generally appear in undistorted, rect-angular form when shrunk to the container and viewed by a consumer. FIG. 8B shows the warped artwork as printed on a planar sheet, before shrink-fitting to the container. (Most of the text in FIGS. 8A and 8B is deliberately blurred to be unreadable, as it is impractical to reproduce faithfully and is not essential to the illustration.)

It is common to perform two rectifications on graphic artwork that is to be shrunk onto non-cylindrical, non-cuboid product containers. One half of the artwork is rectified for viewing from the front of the container, and one half of the artwork is rectified for viewing from the back of the container. (We term a 3D shape that includes a curved surface but is not cylindrical in shape, a curvoid shape. The milk bottle of FIG. 8A is a curvoid object.) The rectification process described and illustrated counteracts the physical area distortion noted above. This physical area variation is not an optical illusion. The distance between longitude lines is actually closer at the poles than at the equator, so areas bounded by latitude and longitude lines actually get progressively smaller at distances away from the equator (thus the term "physical area" distortion).

Figure 9A:
FIGS. 9A, 9B and 9C illustrate the apparent foreshortening of a surface depending on tilt angle relative to the viewer.
Figure 9B:
Figure 9C:

There is a second phenomenon that is an optical illusion: the apparent foreshortening of certain lines. FIGS. 9A, 9B and 9C illustrate.

FIG. 9A shows a straight-on view, from the left, of an object represented by the bold line. That is, the surface normal from the object points to the viewer. We term this surface orientation as "facing" the viewer, or "on-axis" relative to the viewer. FIG. 9B shows a 45 degree viewpoint of an object (i.e., the surface normal from the object is tilted 45 degrees from the viewer). FIG. 9C shows a 70 degree viewpoint of an object (i.e., the surface normal from the object is tilted 70 degrees from the viewer). The double-headed arrows in these figures show the apparent extent of the object based on the tilt. FIGS. 9B and 9C are examples of "oblique" views—views in which the surface normal from the object surface does not point to the viewer.

Mathematically, the visual extent of the object from the viewpoint appears scaled (reduced) by factor equal to the cosine of the tilt. (Here, as elsewhere, perspective effects are ignored, which is a good approximation when the distance to an artwork element is four or more times the dimension of the element.)

To compensate for such foreshortening, artwork on a tilted surface (i.e., a surface viewed obliquely) could be expanded by a factor equal to the inverse of the angle cosine, in the direction of the tilt, in order to have the same appearance as it would from a straight-on viewpoint. For some shapes, such as a sphere, there are tilts in both vertical and horizontal directions that may be taken into account.

Typically, however, product artwork is not compensated for such foreshortening effects. This is because, while consumers predictably view products from front and back directions, there is less predictability in the up/down angle of such view. Is the consumer viewing the front of the product from the equatorial plane? Or is the consumer viewing the front of the product looking somewhat downward onto it (i.e., the top surface is visible but not the bottom surface). Since the foreshortening effect depends on the vertical angle with which the front of the product is viewed, and since the angle is largely unpredictable, no compensation for such effect is typically made in graphical label artwork. However, some patents teach correction for such foreshortening effect in digital watermarks.

Digital watermarks are 2D data codes that carry identification information about a product in an unobtrusive manner, e.g., as a sparse pattern of dots added to the label artwork. Watermark patterns are typically square in shape and are tiled edge-to-edge to cover some or all of the product surface. An exemplary watermark block is about 0.85 inches on a side, and is organized as a 128×128 array of cells, or watermark elements ("waxels"). Additional information on watermark technology is provided in a following section of this specification.

Ideally, a watermark reader operates on imagery that depicts watermark pattern blocks as squares. If an array of watermark blocks is wrapped around a cylinder (e.g., a soda can), and the cylinder is viewed from the front, the blocks nearest the viewpoint will appear nearly square, but as the cylinder surface curves away from the viewer, the foreshortening effect will cause the blocks to become more and more rectangular rather than square. This is termed differential scaling, in which a block appears narrower (or wider) than it is tall.

A watermark detector can try a variety of geometric corrections in an attempt to read watermark blocks having non-square appearances. However, such correction increases computational complexity and slows the reading operation. For applications in which watermark readers must respond quickly (such as reading codes from plastic containers on a waste sorting conveyor that's racing the containers to a sorting unit), it is desirable for watermark pattern blocks to appear square, or nearly so, so that the watermark detector does not need to spend time searching across a large range of possible geometric corrections.

To compensate for the just-noted foreshortening effect on cylindrical surfaces, patent U.S. Pat. No. 6,947,571 teaches that a watermark pattern can be progressively expanded for blocks progressive further from the front of the cylinder: "Consider a Pepsi or Coke can. A virtual center line may pass through the center of the logo artwork (the "front" of the can), and serve as a center line of one of the watermark gridded tiles. On either side of this center line the grid is successively stretched. This stretching is computed so that, when viewed by a camera, the watermark grid has the appearance of being uniformly rectilinear, instead of being successively compressed towards the apparent edge of the can, as would otherwise be the case." Related teachings are found in U.S. Pat. Nos. 9,033,238 and 10,382,645. We term such correction cylindrical warping.

Such cylindrical warping works well if the watermark is to be read from the front of a cylindrical item. This is the case in the quoted patent; it contemplates that a consumer is using a smartphone to capture an image of the front of a product, e.g., as displayed on a store shelf, from which the watermark is read.

While humans are predisposed to view a product from its front, machines have no such predisposition. If a watermarked product is found in waste stream, and is imaged by a camera system looking for recyclable plastic, the product viewpoint is essentially random. (Such a recycling application, including sorting containers by their watermark-indicated plastic content, is detailed in U.S. patent publication 20190306385, PCT patent publication WO2020186234, and pending U.S. patent application Ser. No. 17/214,455, filed Mar. 26, 2021 (now published as 20210299706).) As noted, rectification involves stretching the artwork to make its presentation on a curved, non-cylindrical surface appear equiareal, when viewed from a front or back viewpoint. But if the rectified artwork is viewed from a side viewpoint, the stretching makes things look worse, not better. Consider FIG. 10, which depicts the labeled sphere of FIG. 9 from a side aspect (i.e., after rotating 75 degrees).

If a watermark pattern was embedded in the graphic artwork before rectification, the watermark pattern would be stretched with the graphic artwork. It would appear as a tiled array of square blocks as viewed from the front. But when viewed from a side, the right angles of the watermark blocks would be morphed into acute and obtuse angles, like those denoted by reference arrows 101 and 102 in FIG. 10. And the straight vertical edges of such watermark blocks would be strongly curved, as shown by arrow 103.

Figure 10:
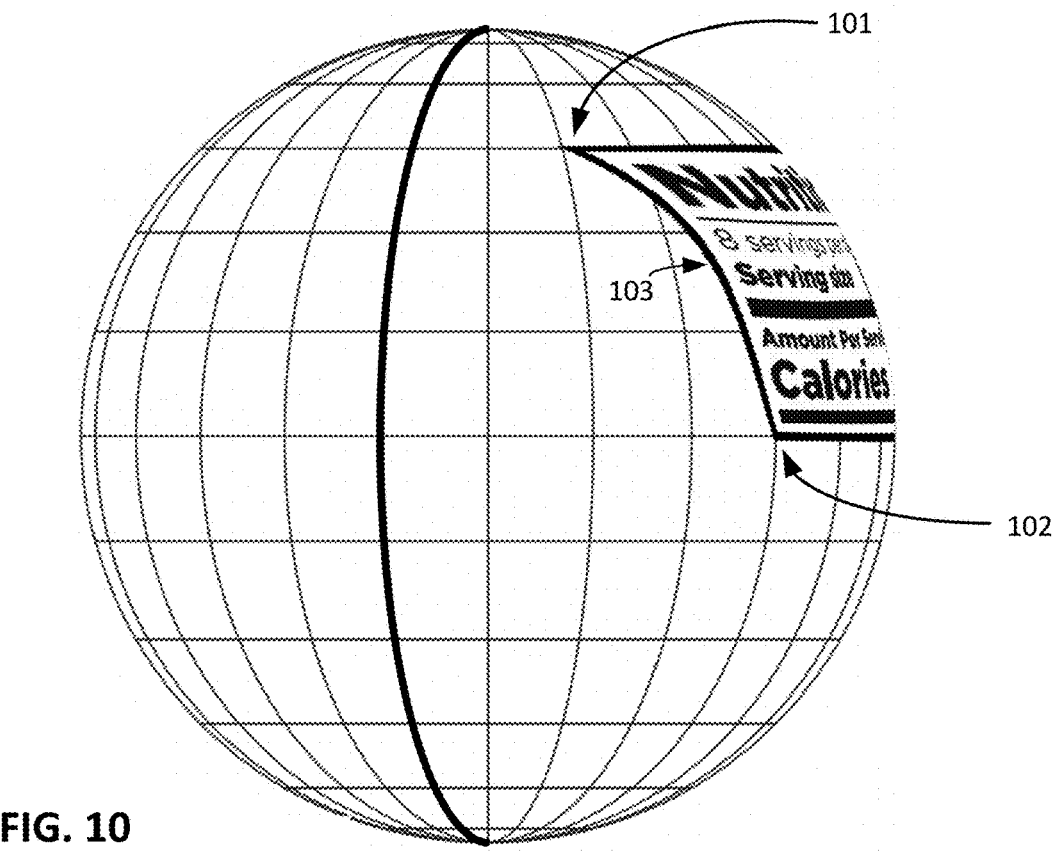
FIG. 10 illustrates that the warp applied to graphic artwork to give it a rectangular appearance with vertical text when viewed from the front of a container, yields curved lines and slanted text when viewed from the side of the container.

And FIG. 10 only shows a graphic pattern warped to the 60 degree longitude line (the longitude on which warped corner 101 lies; the longitude lines shown in the figures are 15 degrees apart). Such distortions get still worse if the warping extends to the 90 degree longitude line—the true side of the shape (shown by the dark line). Such distortions make the watermark signal unreadable from viewpoints near the sides.

Figure 11:
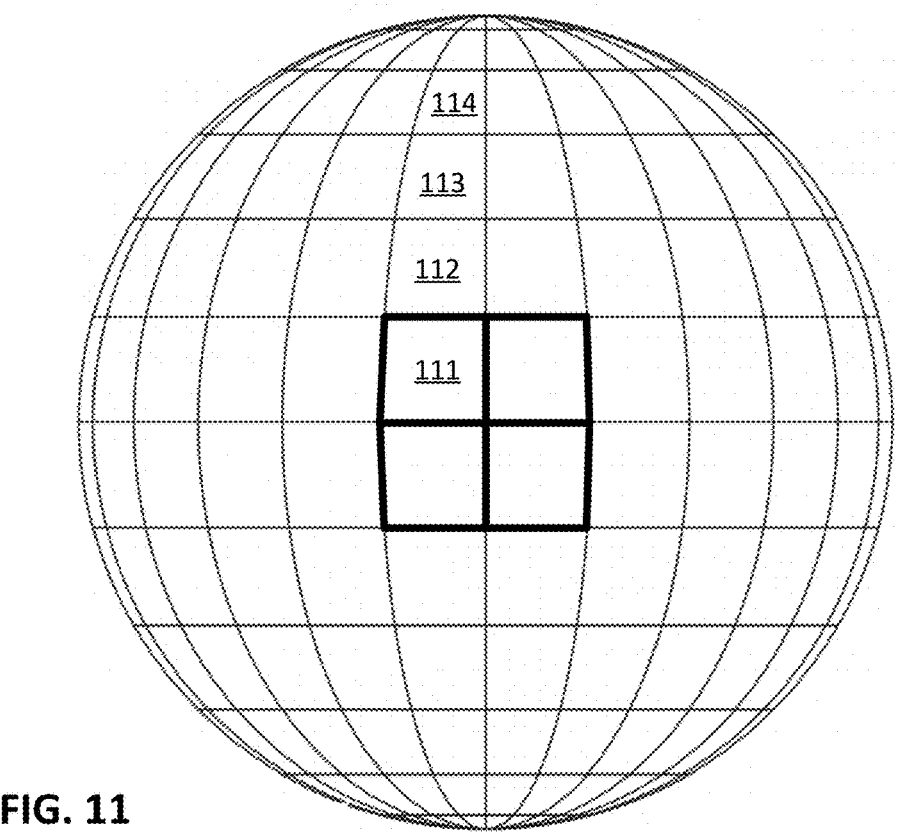
FIG. 11 shows that blocks near the equator along the viewpoint meridian appear mostly square, but blocks above and below have increasing degrees of differential scaling, which limits watermark readability.

Better, from a watermark reading standpoint, is to embed the watermark in the graphic artwork after rectification. Then, after the artwork is shrink-fit to the sphere, the watermark blocks would have shapes of the sort demarked by the latitude and longitude lines of FIG. 11. In such case the watermark block(s) that most nearly face the viewer are close enough to square to be readable without undue delay for geometrical compensation. For example, if the four regions 111 outlined in dark were watermark blocks, they would be readable without a lengthy search for suitable geometric correction. At positions like 112, 113 and 114 that are above and below these equatorial positions, however, the physical area distortions associated with the curved 3D surface—particularly differential scaling (i.e., a block's height and width being different)—get progressively worse, making watermark reading from such vertically-displaced blocks more time-consuming—if possible at all.

In a waste stream, item surfaces that nearly-face the camera (e.g., like regions 111 of FIG. 11) may be obscured by soiling, or blocked from the camera view by an intervening object. Thus, to assure reliable watermark reading, it is desirable to increase the surface area from which watermark blocks can be successfully read.

Applicant has devised various procedures for increasing the surface area from which watermark blocks can be successfully read, without regard to which side of the object is being viewed, and without need for time-consuming geometric correction, A first procedure is illustrated with reference to FIGS. 12-16.

FIG. 12 shows a bottle profile having a diameter that varies with height. It has three bulges along its height, each with one or two adjoining waists. To label such a bottle, a printed flat sheet is wrapped to form a cylindrical sleeve large enough to fit the bulges. Heat is then applied to shrink the sleeve, in places, to conform to the bottle shape.

This shrinking of the sleeve at the waists reduces the horizontal extent of any watermark blocks printed in these areas. This makes watermark blocks at the waist narrower than they are tall. To avoid such differential scaling of the watermark pattern, applicant pre-warps the watermark blocks to reduce their vertical extent in such areas prior to printing on the flat sheet. By such arrangement, when shrunk at the waist, the sleeve will present watermark blocks that are again square. The blocks' side dimensions will be smaller than elsewhere on the bottle, but their lack of differential scaling simplifies decoding.

FIGS. 13A and 13B show this effect. FIG. 13A shows a uniform checkerboard pattern, shrink-fit to a bottle waist. (The depicted checks are smaller than watermark blocks, but larger than watermark waxels.) As can be seen, the horizontal shrinkage of the pattern at the waist near the viewpoint meridian (the double-headed arrow) leads to elements that are vertically elongated, and thus difficult to read. FIG. 13B shows applicant's first technique. By pre-warping the pattern to vertically-compress the elements—in proportion to the bottle diameter—while the sleeve is still in its unshrunk state, the pattern after shrinking will present square watermark elements at the waist (albeit of smaller size than at the bulges).

A single circled element is shown at the waist in each of FIGS. 13A and 13B. The element in FIG. 13B is more square than the counterpart element in FIG. 13A.

To give a particular example, consider a bottle with a maximum two inch radius. Its circumference is about 12.5 inches, which is then the width of the plastic substrate that will be printed and joined at opposite edges to form a cylinder. At its waist the bottle has a diameter of 1.5 inches, or a circumference of about 9.5 inches. The waist circumference is thus 75% of the largest circumference. A watermark block may be sized so that a row of 15 blocks can be printed side-by-side along the 12.5 inch width of the plastic substrate. Each such block is 0.833 inches on a side. When shrunk horizontally to fit the waist, blocks in the row along that part of the bottle will be 75% that size in width, or 0.625 inches wide. To keep such blocks square, such row of blocks printed on the substrate is compressed to be 0.625 inches tall (while still being 0.833 inches wide). When the printed sleeve is shrunk to the bottle waist, the final blocks along the waist are 0.625×0.625 inches in size. The final blocks along the largest bottle circumference are 0.833×0.833 inches. Both are square. In this example, the warping function is thus a localized vertical compression of block heights by a factor equal to the ratio of the maximum bottle radius to the local bottle radius. (Since such formula gives compression, larger values indicate the blocks are compressed more, i.e., they are squeezed more vertically.) Given data defining the bottle radius as a function of height up the bottle, the vertical warp to be applied as a function of height up the bottle can thus be computed.

The warping procedure is more particularly detailed by the flow chart of FIG. 14. The process starts with an image file representing the 2D label graphic artwork. (A watermark may be regarded as an element of graphic artwork, but for purposes of the present specification the term "graphic artwork" generally refers to non-watermark elements.) At step 140 this artwork is rectified for front and back viewing (akin to FIG. 8B). In step 141 this rectified image is then locally warped vertically as a function of radius, in a manner inverse to that to be applied in step 143.

After the rectified label artwork has been warped, a watermark signal is applied, as indicated at step 142 in FIG. 14—combining a tiled pattern of square watermark blocks with the rectified label artwork.

Figure 15:
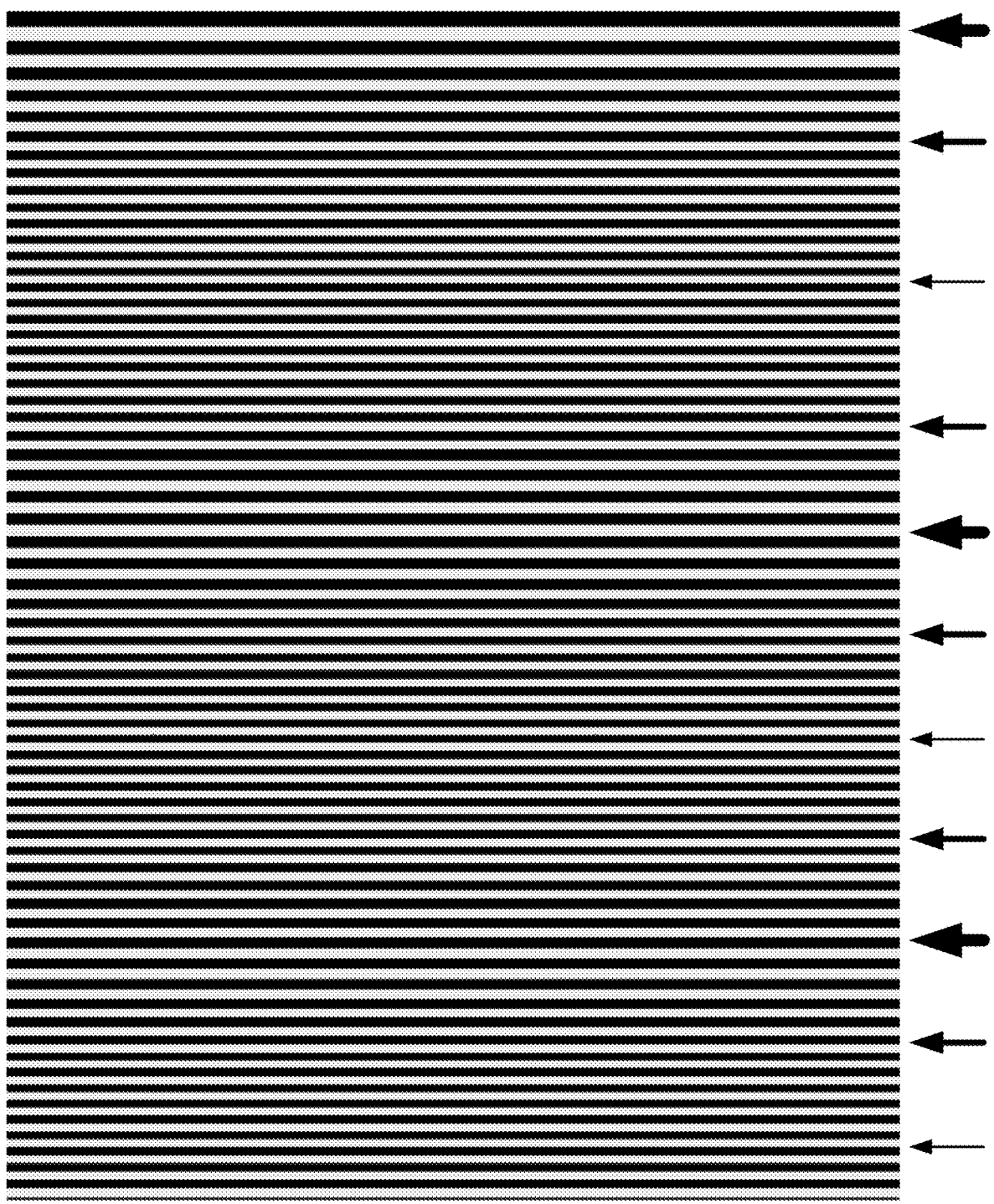
FIG. 15 is an illustration of a warp pattern corresponding to the bottle configuration of FIG. 12.

The warping of the tiled watermark blocks that is ultimately needed for the FIG. 12 bottle is illustrated in FIG. 15. The heights of the alternating bars indicate the relative vertical compression that is to be applied to corresponding horizontal bands of the watermark pattern. (Again, since compression is being indicated, the larger bands indicate more squeezing, i.e., shorter blocks.)

The three regions of wide bars in FIG. 15 (shown by the boldest arrows in the right margin) correspond to the neck and two waists of the FIG. 12 bottle, where the bottle diameter is relatively small; the three areas of narrow bars correspond to the three bottle bulges.

At step 143 the warping earlier-applied in step 141 is un-done by applying an inverse warp. This restores the graphic artwork to its rectified configuration for printing. And this warping of step 143 also applies vertical warping to the just-applied tiled pattern of square watermark blocks, vertically compressing some of them. The areas that are vertically-compressed correspond to the regions of the label that will be shrunk around the bottle waists. The vertical compression of the watermark blocks, paired with the horizontal shrinkage, restores them to a square configuration when applied to the bottle. (Such blocks are of a smaller scale, but watermark readers are robust to variations in scale.)

A plastic sheet is then printed with the resulting artwork, and is shrink-fit to the FIG. 12 bottle. The graphic elements of the artwork are left unchanged by the successive warping/inverse warping operations, and are transformed only by rectification—yielding the desired artwork appearance when the product is viewed from the front and back (as with the bottle of FIG. 8A). And regardless of which longitude faces a watermark reader (i.e., the viewpoint meridian), the watermark blocks up and down along that longitude, from the top of the container to the bottom, have been compensated to reduce their physical area distortion, enlarging the area from which the watermark pattern can be read.

The vertical warping described in the FIG. 14 flowchart does not alter the fact that square blocks mapped to the FIG. 12 bottle surface will have somewhat curved edges. The curvature is greater for blocks further to the left and right of the viewpoint meridian.

Similarly, the vertical warping described in the FIG. 14 flowchart does not counteract the apparent foreshortening of surfaces due to their tilt angles.

Those phenomena could be addressed by rectification, as described earlier, but at the price of making the watermark readable only from front and rear viewpoints. The present method, in contrast, improves watermark decoding when the container is viewed from any side angle, as it enlarges the readable area along the viewpoint meridian. No longer are watermark blocks readable only from the bulges (i.e., where there is nil horizontal shrinkage); instead, the watermark blocks are now also readable from waists, and at some locations in-between.

The process of FIG. 14 involves warping the input label artwork three times. It is sometimes preferable to limit the number of warpings applied to label artwork. An alternative, second process is detailed in the flowchart of FIG. 16.

In this second arrangement the graphic artwork is warped only once: rectification to yield an undistorted front view when the printed label is shrink-fit to the container. This is the same as step 140 in FIG. 14.

A tiled array of watermark blocks is separately warped vertically, in anticipation of the horizontal label shrinkage. This is the same as warping step 143 in FIG. 14 (although there it is termed an inverse-warp, since it also functions to remove an earlier-applied warp). The rectified artwork is them summed with the warped watermark pattern to yield artwork for printing.

Figure 16:
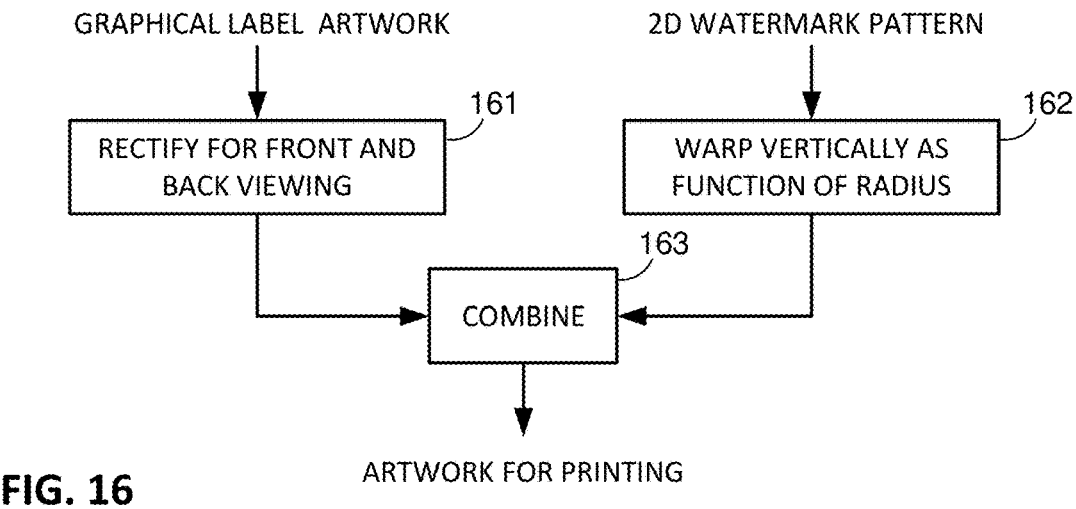
FIG. 16 is a flowchart of another process incorporating certain aspects of the detailed technology.

Sometimes the FIG. 16 method is not practical because the watermark pattern depends, in some aspect, on the graphical artwork at the same or nearby locations. For example, sometimes the strength of the watermark signal is modulated in accordance with local data hiding attributes of the artwork, such as spatial contrast frequencies. (High frequency, busy areas of artwork, such as a depiction of a grass lawn, can conceal more watermark signal than low frequency, flat artwork, such as a depiction of a uniformly blue sky, so watermark amplitude can be increased in the former areas and/or decreased in the latter areas.) Similarly, sometimes the watermark pattern is printed using colors that are selected based on colors of the graphical artwork at different locations. Or the local strength of the watermark may depend on the color of the artwork. Or the type of watermark—continuous tone or binary (sparse)—can vary in different regions of the graphical artwork. If a sparse mark is used, its dot density can vary in different regions of the artwork. Etc. (The graphical label artwork may be termed "host artwork." The attributes of the watermark that locally depend on the host artwork may be regarded as a "2D control signal" that is co-extensive with the host artwork—serving to vary the strength, color, type, density, etc., of the watermark signal.)

Figure 17:
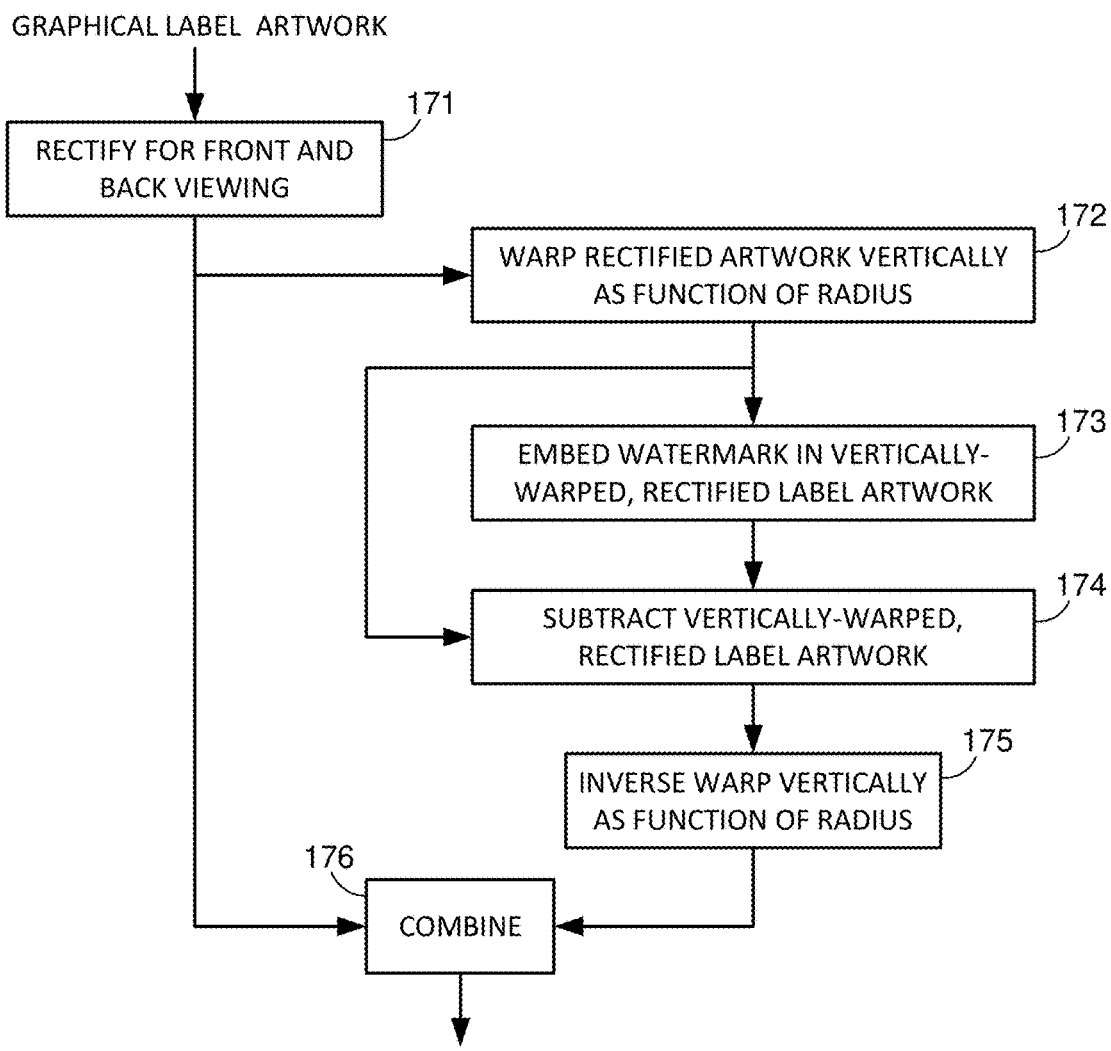
FIG. 17 is a flowchart of still another process incorporating certain aspects of the detailed technology.

To account for such local dependence of the watermark on the host artwork, a third process, shown in FIG. 17, can be used. Here the host artwork is warped just once, at step 171. At step 172 the rectified host artwork is vertically-warped as a function of container radius. (This is the same operation as at step 141 in FIG. 14.) At step 173 a watermark is embedded in this rectified and vertically-warped label artwork, yielding watermarked, rectified, and vertically-warped label artwork. This embedding includes the noted strength/color/type/density/etc. adaptation of watermark features in accordance with local attributes of the artwork into which it is being embedded. (Unless otherwise indicated, the verb "embed" encompasses such adaptation to the host artwork; "combine," in contrast, commonly indicates the absence of adaptation.)

At step 174 the vertically-warped and rectified label artwork is subtracted, leaving just the watermark. But the watermark has now been locally-adapted, e.g., based on attributes of the label artwork. At step 175 this adapted watermark is warped vertically as a function of container radius. This is the warping in which the watermark is vertically-compressed in the small diameter waist regions, in anticipation of the label being physically shrunk horizontally. This warp is the inverse of the warp applied in step 172. (This is the same warping applied in step 143 of FIG. 14, but here it is applied to the watermark alone, not the watermarked label artwork.) The resulting vertically-warped watermark pattern is then combined (e.g., summed) with the rectified label artwork at step 176, yielding artwork for printing.

Other such variations are naturally possible. Most are characterized in that the concatenation of all warpings applied to the host artwork yields the desired rectified artwork needed for undistorted front viewing. And the concatenation of all warpings applied to the watermark signal yields the localized vertical compression/expansion need to make watermark elements appear as squares after shrink-fitting, regardless of container diameter.

Figure 18:
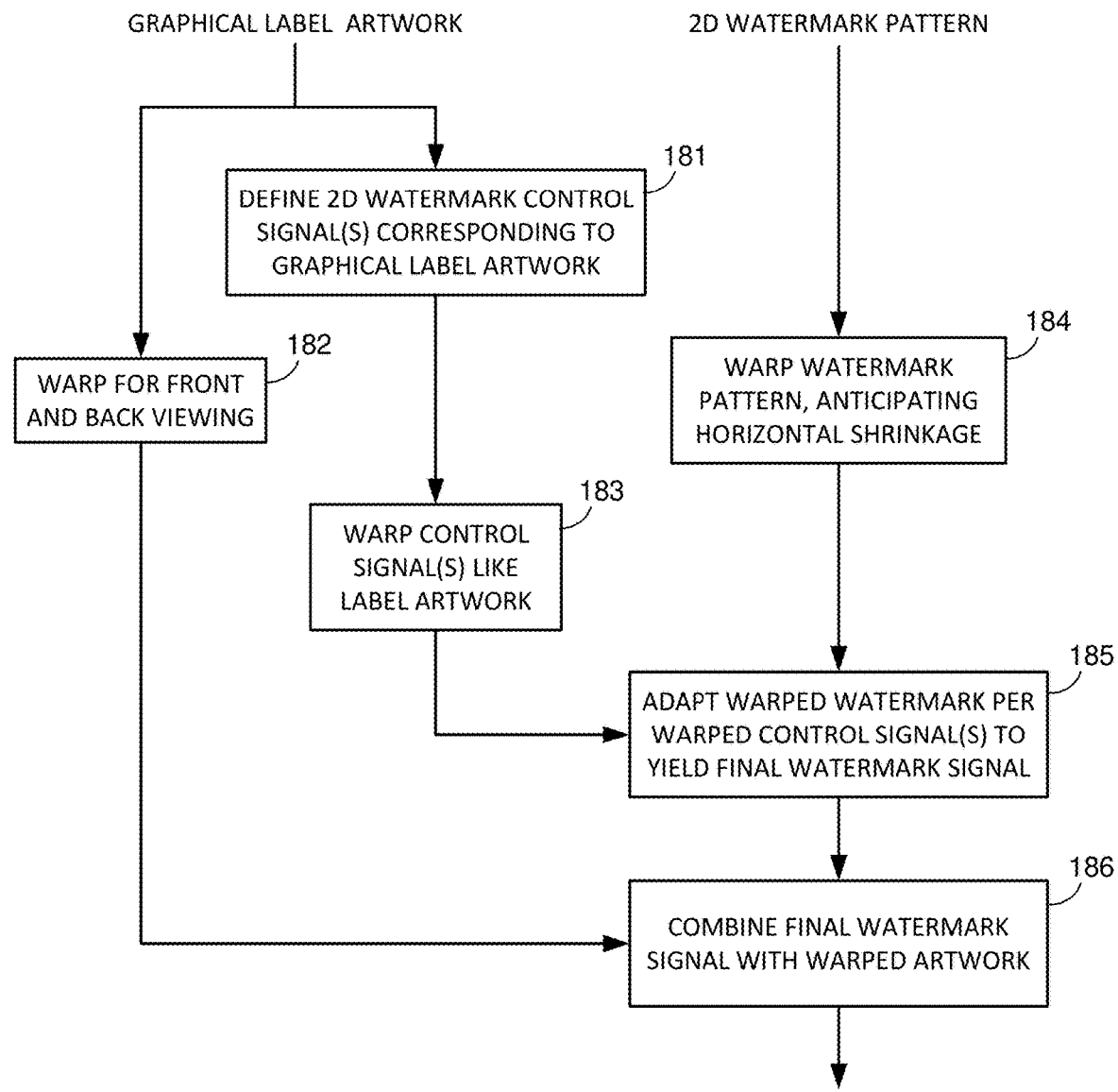
FIG. 18 is a flowchart of yet another process incorporating certain aspects of the detailed technology.

A fourth technique proceeds as shown by the flowchart of FIG. 18. In this arrangement the final watermark signal is treated as having two components: a 2D pattern that is invariant to the host image, and a 2D control signal that defines the local strength/color/type/density/etc. adaptations that are based on the host image.

Figure 19:
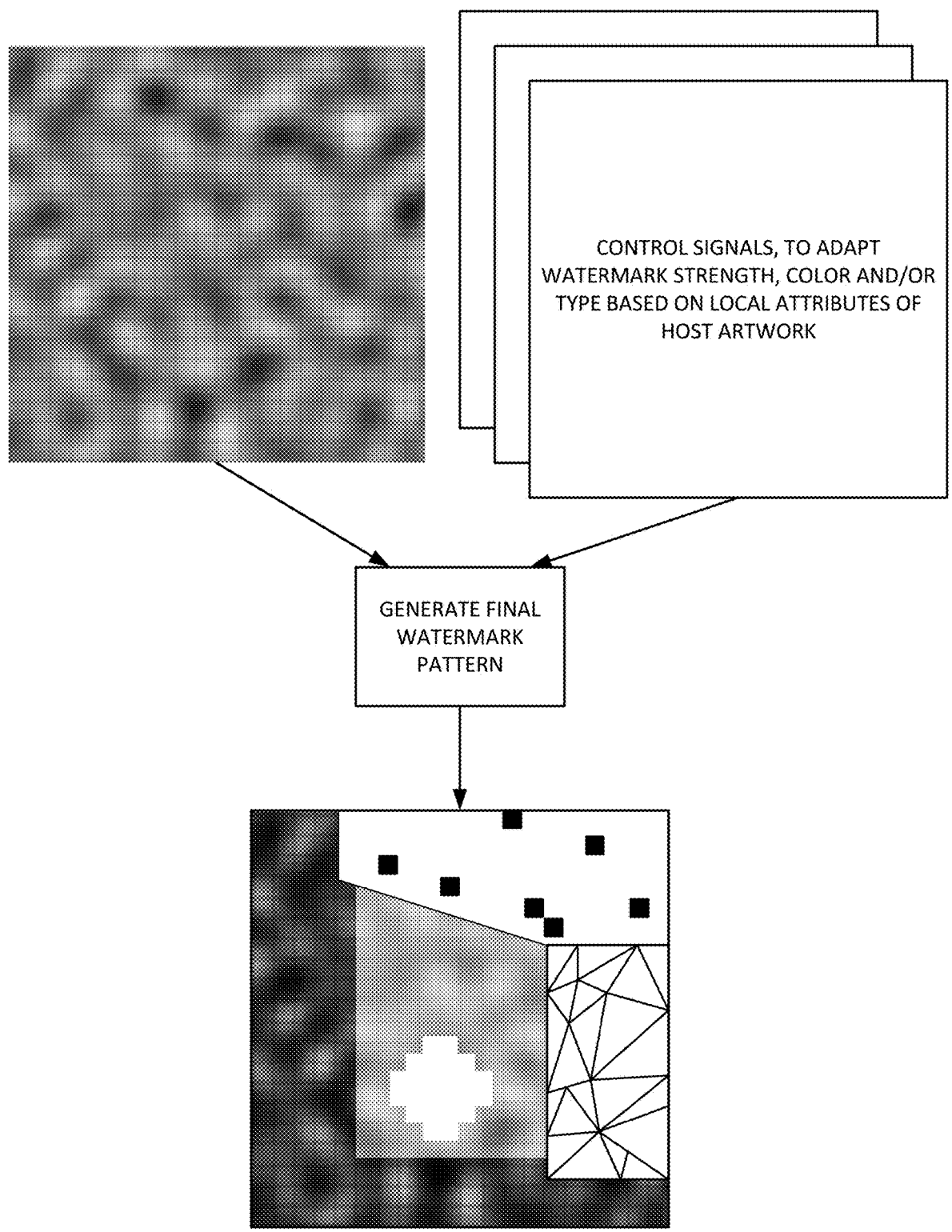
FIG. 19 conceptually illustrates how watermark signals for an artwork can be defined by a continuous tone watermark block, in conjunction with a set of control instructions indicating how the block should be rendered at different positions.

FIG. 19 elaborates on these two components of the final watermark signal. In the upper left is an excerpt of a continuous tone watermark pattern, incorporating both reference signal and payload signal parts. (This excerpt depicts only about 3% of a watermark signal block, or an area of about one-eighth inch on a side at typical scales.) In the upper right is a representation of 2D control signals, which adapt the watermark strength, color, type, density, etc., of the final watermark based on local attributes of the host artwork. Some of these control signals can be algorithmically determined, e.g., by a formula varying the local watermark strength or dot density based on local contrast frequency or local color of the host image. Others can be judgments made by a graphic artist, e.g., deciding that a sparse watermark would be more aesthetically appropriate in certain regions, and a continuous tone watermark would be more aesthetically appropriate in other regions, and a Delaunay pattern would be more aesthetically more appropriate in still other regions, and that yet other regions would be best left unwatermarked. Such decisions may be based, e.g., on whether the graphic artwork in a corresponding region is text, or a flood of red spot color ink, or is a flood of Pantone 1051 ink, or is a feature of a particular shape, or is a CMYK photograph, or is a line illustration, or is a corporate trademark, or is a legally-required labeling element, etc. The continuous tone watermark pattern is then adapted, based on the control signals, to generate the final watermark pattern, shown at the bottom of FIG. 19. For example, its amplitude is adjusted in some places; its type is converted to a sparse mark in some other places; its type is converted to a Delaunay pattern in other places; and still other places are left unwatermarked.

Returning to the flowchart of FIG. 18, the graphical label artwork is provided at the top left, and step 181 indicates the generation of the control signal(s) by the algorithmic and/or artistic judgment processes just reviewed. The label artwork is warped for front/back viewing at step 182, producing artwork like that of FIG. 8B. This same warp operation is applied, at step 183, to the 2D watermark control signals just-mentioned.

The right side of FIG. 18 starts with the 2D watermark pattern, i.e., watermark blocks tiled edge to edge to span the sleeve that ultimately will be shrink-fit to the container. The input watermark pattern may be a continuous tone pattern, like that shown in the upper left of FIG. 19, or it may be in the form of a sparse mark, or a Delaunay pattern (or stipple pattern, or Voronoi pattern, etc.). The watermark pattern is warped, at step 184, in anticipation of the pattern deformation that will accompany the label shrinkage to the 3D container. A final watermark pattern is then produced, at step 185, by applying the watermark control signals to the warped watermark pattern. At step 186 this final watermark pattern is combined with the warped label artwork, yielding the final label artwork Still another, fifth, approach is to generate a watermark signal of tiled square blocks large enough to cover the container, and then warp it in accordance with the container shape (e.g., where the bottle diameter is narrow, compress the waxels vertically in anticipation of later being physically shrunk horizontally). Then this warped signal is embedded into the warped host artwork (e.g., like FIG. 8B)—taking into account local properties of the artwork and adapting the watermark signal accordingly (e.g., in strength and/or color).

Such arrangement requires modification to the usual watermark embedder, which normally applies the same square blocks to all areas of the host artwork. In this application the blocks are of different shapes—depending on container contours. Thus, a full sheet of warped tiled blocks is embedded across the full warped host artwork, rather than tiling uniformly-square blocks across the artwork.

Desirably the steps of the foregoing flowcharts are all performed by a single software tool. Such functionality can be incorporated, for example, into pre-press software tools offered by vendors such as Esko, Hybrid Software, Inc., and SGK Schawk, LLC.

Review of Warping

Warping operations are familiar to artisans. A brief review of certain aspects follows.

An input graphic defines artwork elements at locations in a 2D space. For convenience we assume the artwork is a rasterized image, i.e., it is comprised of discrete elements (e.g., pixels) at nodes within a regular array of row/column coordinates, although this is not essential. Each element has an associated value, such as a greyscale or color value.

A simple warping function is a location-mapping transformation that maps each element in the input image to a corresponding location in the output image. The transformation is commonly a function of the row and column locations of the input image elements.

Figure 20:
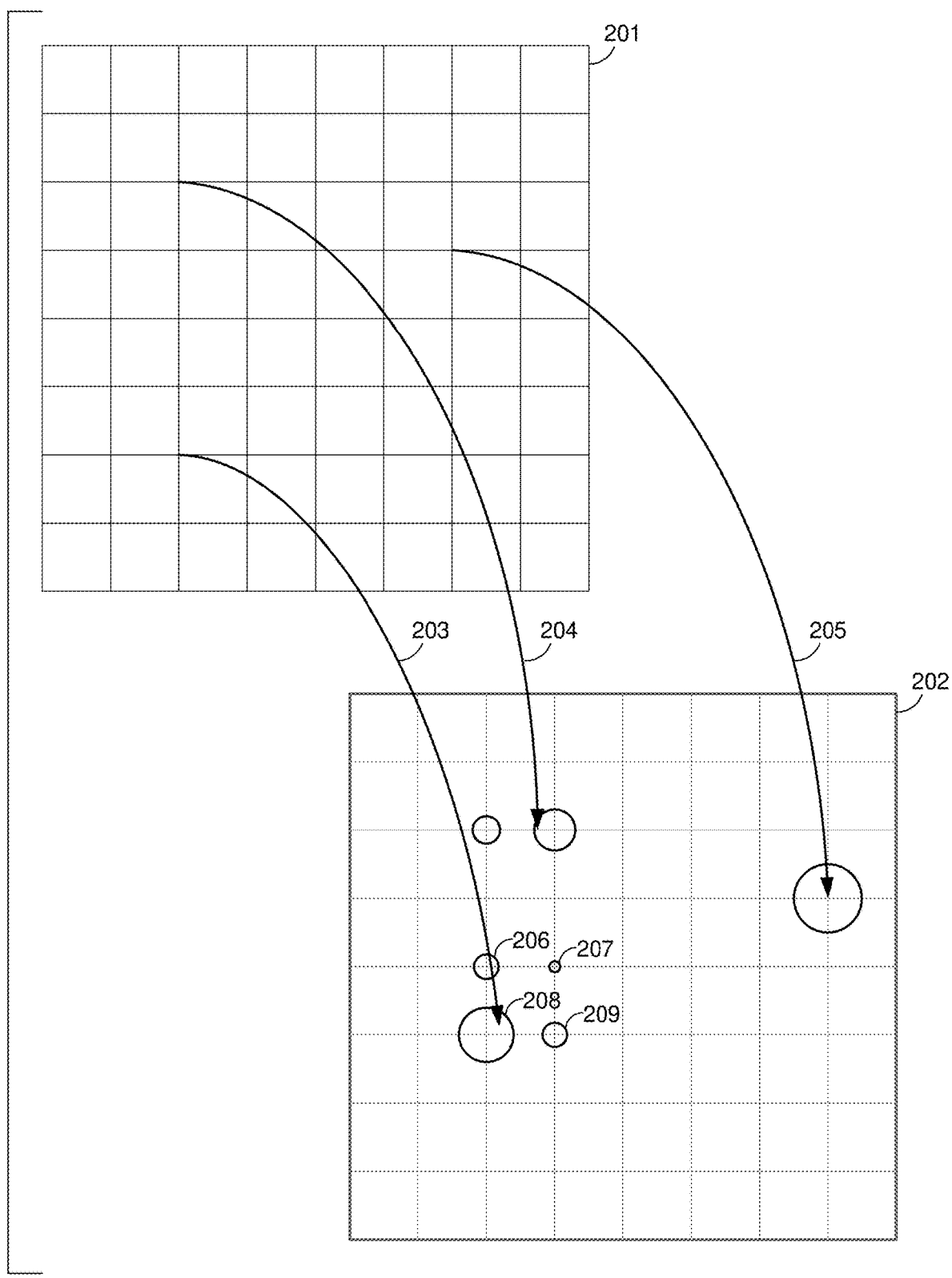
FIG. 20 illustrates aspects of a warping operation.

Such a mapping is shown in FIG. 20. Three arrows 203-205 are shown, illustrating mapping of three elements in the input image 201 to corresponding locations in an output image 202. Each arrow starts at a row/column node in the input image (indicated by coordinate line-crossings), but may end up between such nodes in the output image (as indicated by the tips of the left two arrows). In such case the input element's value is distributed among neighboring nodes in the output image, with nearest nodes getting the largest portions.

The mapping function causes arrow 203 to end in an area between four nodes 206-209. The nearest of these nodes (208) is given the largest apportionment of the original element value (indicated by the larger of the four nearby circles), with the other three nodes given apportionments depending on their respective distances (indicated by the sizes of the other three circles.)

The mapping function causes arrow 204 to end at a point on a horizontal line between two nodes. In this case, the input element value is apportioned between just these two output image nodes, with the apportionment again depending on distance to the two nodes (as again indicated by the sizes of the two circles).

The mapping function causes arrow 205 to end exactly at a node location in the output image. In such case, the element value of the input image is applied to only that node in the output image (indicated by the single, large circle).

Generalizing, if locations in the input image 201 have coordinates u and v, and locations in the output image 202 have coordinates x and y, then the warp is defined by the mapping functions f and g, where $x=f(u,v)$ and $y=g(u,v)$. In the examples discussed above, in which a watermark pattern is compressed or expanded vertically in anticipation of later horizontal shrinkage, the function f is simply the identity function. That is, $x=u$.

In some embodiments the warping function is expressed as a 2×2 or 3×3 matrix. In others it is established by a formula or table defining the diameter of the container at different distances above its based.

Warping operations can typically be reversed. If the "forward" warp discussed above produces image 202 from image 201, then the "inverse" warp produces image 201 from image 202. This, again, is an exercise in location mapping, but now goes from locations that are commonly in-between coordinate nodes in image 202, and maps values from such locations to respective coordinate nodes in image 201. To obtain a value at locations in-between the coordinate nodes in image 202, interpolation—such as bilinear interpolation—is employed. For example, in reversing the arrow 203, the value assigned to the indicated node in image 201 is a weighted sum of the values at nodes 206-209 in image 202.

If the forward warping function is expressed as a matrix, the inverse warping function is the inverse of that matrix.

Grading

As noted, a human graphic designer may make certain decisions about a digital watermark included in host artwork, including its strength, type and placement. Desirably, the artwork is checked after watermark embedding to assure that the watermark is readable across all embedded regions. Similarly, once artwork is set for printing on a press, checks are desirably made to assure, e.g., that necessary plates and correct inks are being used. Finally, when items are being printed it is customary to perform quality assurance checks on the finished printed items. In all such "grading" procedures, consideration should be given to the warping of the watermark pattern.

The earlier check, before any press involvement, typically occurs in the digital realm, and is termed digital grading. Models can be applied to simulate the appearance of the final printed item, taking into account the color spectra that will result when particular inks are applied to particular substrates (i.e., the blend model), and to estimate the image data that an expected camera capture system (i.e., in a recycling facility) may acquire after introduction of typical imaging noise sources and blur (i.e., the capture model). Such modeling can also apply geometrical transformations based on the 3D shape of the labeled item relative to the expected capture viewpoint. The aim is to predict, to the extent possible, the image data that will be provided to the ultimate decoder (e.g., a watermark reader in a recycling facility).

Pre-press grading can include printing the watermark-embedded digital artwork on a proofing printer (e.g., an inkjet printer, such as the Epson 4900 printer using a GRACoL profile and semi-matte paper), scanning the print sheet on a flatbed scanner (e.g., an Epson V39 scanner), and analyzing the resulting scan data. In such case the blend model is replaced with a modified model characterizing rendering differences between the proofing printer and the expected press, and the capture model is replaced with a modified model characterizing capture differences between the flatbed scanner and the expected capture camera. Applicant terms such arrangement a Desktop Verify system, relying as it typically does on a desktop scanner.

Quality control on the final printing press can also be checked with the Desktop Verify system. A test press sheet is printed on the press and scanned on a flatbed scanner. There is no need to model the ink blend on the substrate, nor to model the difference between the proofing printer and the actual press, because the press sheet is printed on the actual press with the actual inks on the actual substrate. However, the modified capture model is still applied to derive a set of image data like that which is expected to be produced by the capture camera system, based on the image data produced by the flatbed scanner.

Illustrative blend and capture models, and the Desktop Verify system, are detailed in our patents U.S. Pat. Nos. 11,188,996, 10,382,645, and 9,690,967.

Applicant commonly employs two metrics to assess the strength of the watermark in embedded artwork. One metric is based on the strength of the watermark reference signal, and one metric is based on the strength of the watermark payload signal. (These two components are further described, e.g., in the above-cited patent documents.) The two metrics can be combined to yield a hybrid score. By assessing such metrics at an array of points across an embedded image, a "heat map" indicating variation in watermark strength across the artwork can be obtained.

During operation of the press, it is prudent to perform in-line monitoring—imaging the sheets as they are printed and checking that the measurements just-described do not differ by more than a predetermined amount from those earlier-determined based on the test press sheet. Additionally, or alternatively, the press operator can occasionally pull a sample sheet from the press run, scan it with a mobile reader or flatbed scanner, and make spot checks of the watermark quality at various prescribed "fidelity points." Such tests during press operation sometime reveal degradation in the watermark quality due to mechanical stretching or slipping of webs or belts used in the press, leading to differential scaling and other forms of distortion of the printed artwork. Such quality assurance techniques are detailed, e.g., in our patents U.S. Pat. Nos. 10,789,438 and 11,250,535.

In accordance with a further aspect of the present technology, the warping detailed earlier is taken into account in grading of watermarked artwork.

Digital grading is commonly performed using the same computer system that performed the watermark embedding (e.g., a computer running a pre-press graphics program). As such, the data earlier used to define the watermark warp function (e.g., the bottle diameter as a function of height) is available and can be used to determine what the pattern will look like after the printed substrate is heat-shrunk to the container. For example, if a substrate 12.5 inches in width is printed with blocks that are 0.833 inches wide and 0.625 inches tall at a particular location, and such location corresponds to a part of the bottle having a radius of 1.5 inches, then such data can be used to indicate that these blocks will be shrunk to a physical size of 0.625×0.625 inch. We call such information a shrink-modeling transform, although it may consist simply of the bottle measurements. The shrink-modeling transform can be applied to the final digital artwork, yielding processed artwork in which the watermark is depicted as it would be captured from the final container (e.g., as shown in FIG. 13B). Digital grading process then proceeds using this processed artwork.

Figure 21:
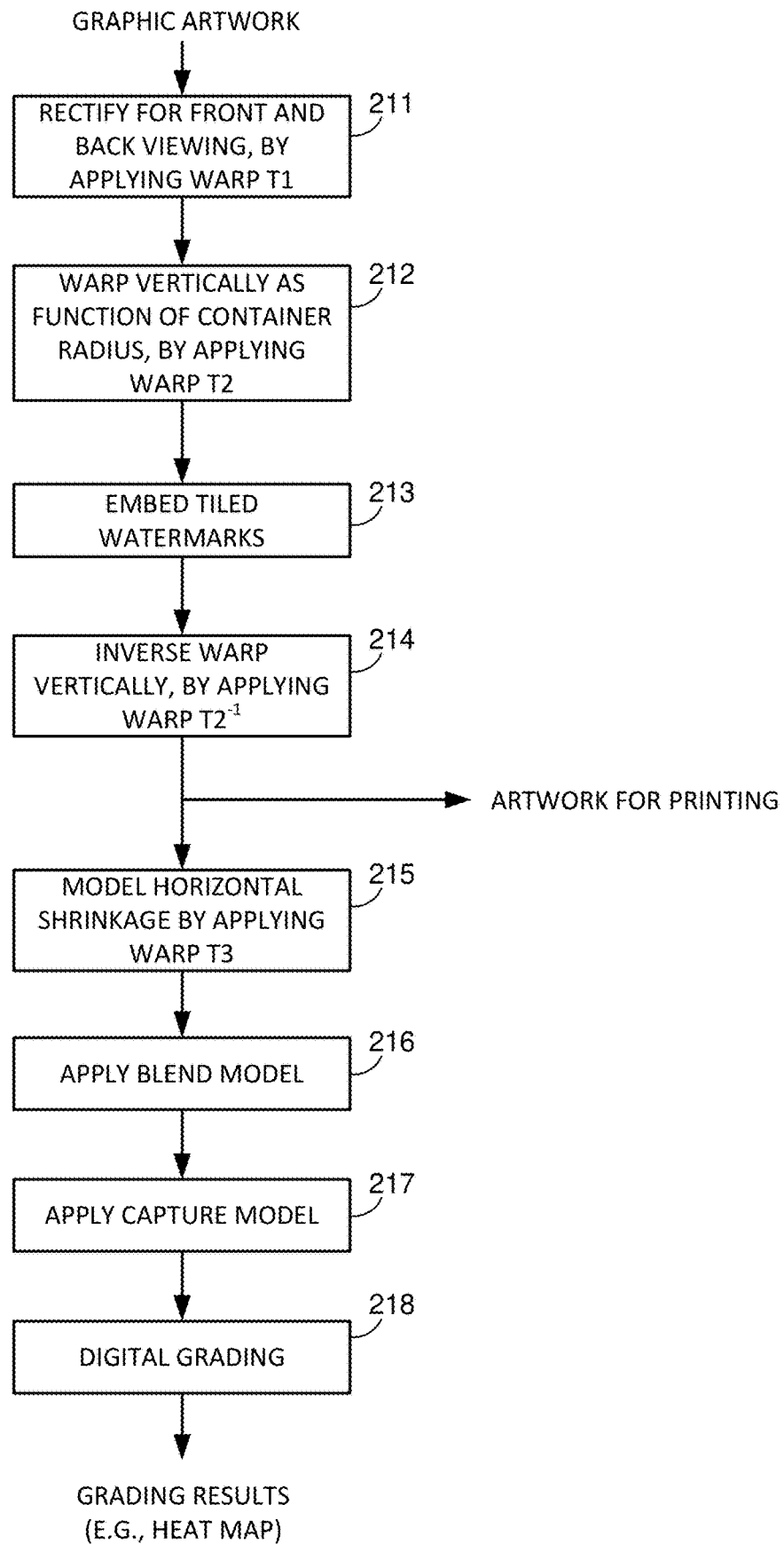
FIG. 21 illustrates a process including digital grading, including certain aspects of the detailed technology.

FIG. 21 shows the method of FIG. 14 with the addition of digital grading. The warps are now denoted by transforms T1, T2 and T3. The warp T1 applied in step 211 is the transformation used to rectify the graphic artwork for human viewing from the front and back. The warp T2 applied in step 212 is the inverse of the transformation used to vertically compress the watermark elements at the waists of the container in anticipation of horizontal shrinkage. That is, warp T2 vertically expands the graphic artwork in regions where it will later be compressed by the later warping operation, so the graphic artwork is unchanged from its rectified form. The tiled array of square watermark blocks is then embedded at step 213.

In step 214 a warp $T2^{-1}$ is applied that reverses that of step 212, and vertically compresses the watermark-embedded artwork. This restores the graphic elements to their original rectified appearance, while vertically compressing the formerly-square watermark elements based on container radius.

At step 215 the artwork—now including the rectified graphics and the vertically-warped watermark pattern—is warped again, by shrink-modeling transform warp T3, to model the horizontal shrinkage that occurs when the label is heat-shrunk to the container. This warp reshapes watermark blocks along the waists to square, albeit smaller, configuration. At steps 216 and 217 the blend and capture models are applied, to generate a dataset simulating that captured from the press inks on the press substrate, using the expected camera system. At step 218 digital grading is conducted, indicating strength of the watermark signal at locations across the artwork.

The method just-detailed can be adapted to the methods shown in FIGS. 16, 17 and 18, by taking the output digital file, and applying a shrink-modeling warp that reduces the widths of the blocks along the bottle waists, resulting in small but square blocks. Digital grading is then applied to the shrink-modeled artwork, after application of the blend and capture models.

In an alternative embodiment, the final artwork is not shrink-modeled for digital grading. Instead, digital grading is performed on the artwork at an intermediate stage of its production, after the watermark pattern has been embedded, but before it has been warped. In FIG. 14, such digital grading can occur between steps 142 and 143.

The non-digital forms of grading involve capturing an image of a printed sheet—either a sheet printed by a proofing printer, or a sheet printed by the final press. Two further issues must be confronted in non-digital grading: defining the shrink-modeling warp, and geometrically registering the captured image data to a known state.

The first issue arises because the computer system that performs the warping of the watermark signal is typically not the computer system that performs the grading of the printed sheet. Thus, shrink-modeling information (e.g., 3D container shape) must be passed from a first, watermark-embedding computer system to a second, watermark-grading computer system.

In one illustrative embodiment, the first computer system stores parameters characterizing the shrink-modeling warp in metadata that accompanies the digital artwork for printing. It is thus available to any computer having access to this pre-press artwork, which can include the second computer system.

In another illustrative embodiment, the first computer system uploads information about the shrink-modeling warp to a cloud repository, from which it is accessible to the second computer system.

The second issue arises because, in order to shrink-model the captured image of the printed sheet, the second computer must register the captured imagery within the coordinate space in which the shrinking function is defined, i.e., the coordinate space in which the pre-press artwork was originally-defined.

Figure 22A:
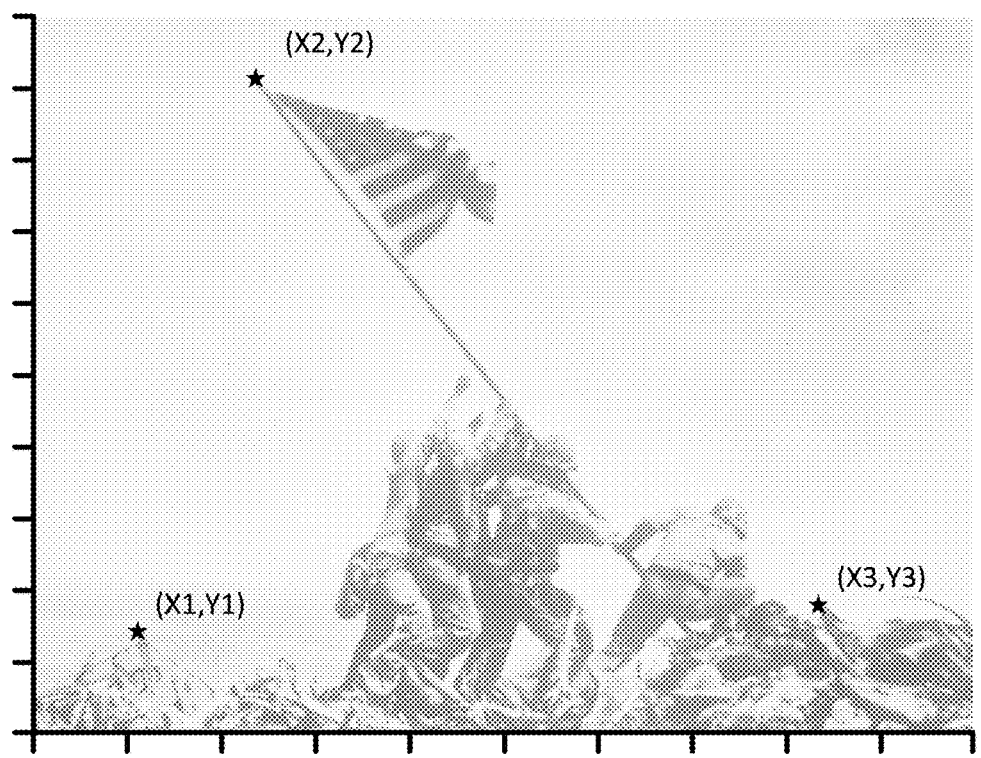
FIG. 22A conceptually illustrates a frame of reference for original digital artwork.
Figure 22B:
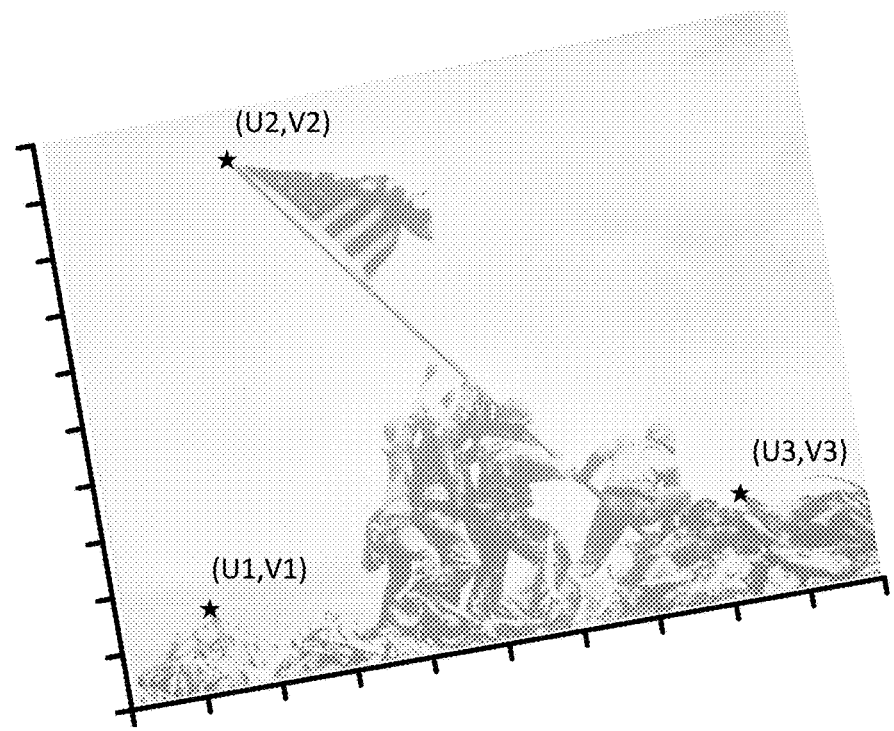
FIG. 22B shows how imagery captured by a camera or scanner system can have a different frame of reference than the original frame of reference (e.g., including 80% scaling and 10 degree counterclockwise rotation).

An input 2D image captured by a scanner or camera can be registered to an original, digital reference coordinate space by sleuthing the affine transform and translation needed to bring three points within the image into alignment with three corresponding points known within the reference coordinate space. This is conceptually illustrated by FIGS. 22A and 22B. FIG. 22A shows, by the bold axes, a reference coordinate frame in which the artwork was digitally defined by the first computer system. FIG. 22B shows, by the bold axes, a coordinate frame of a captured image, e.g., captured by mobile phone or a scanner from a proof sheet. Three reference points are defined in the reference coordinate space of FIG. 22A, and counterpart points are shown in the captured image coordinate frame of FIG. 22B.

Figure 23:
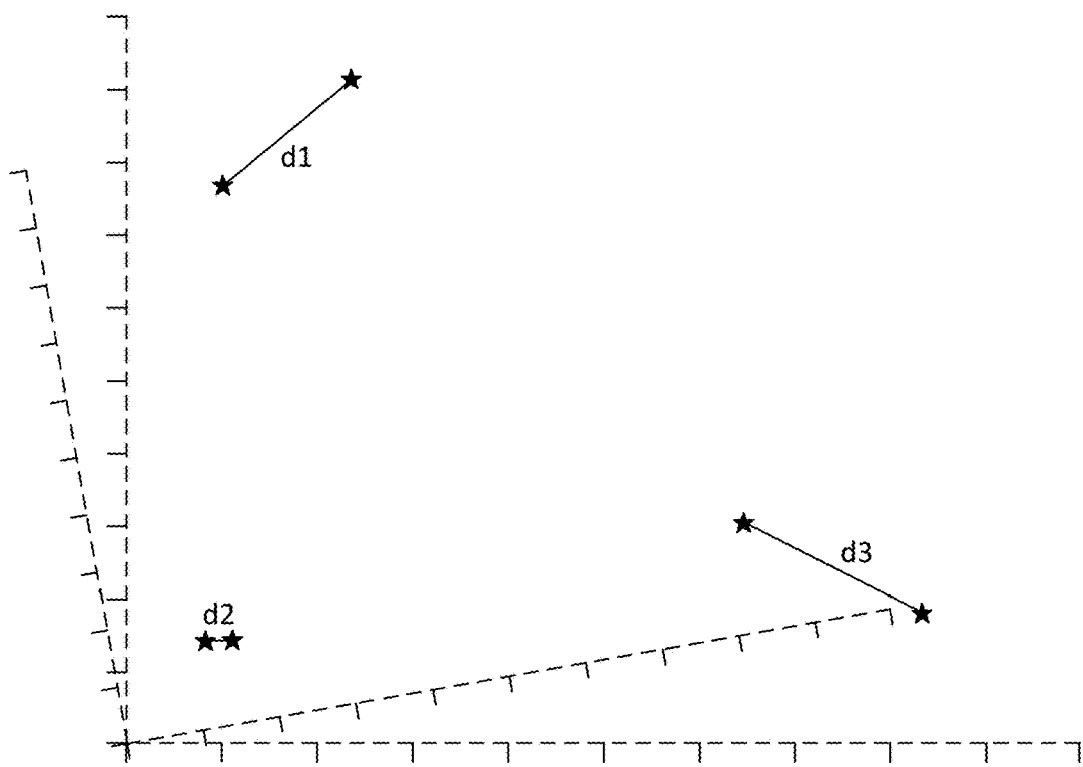
FIG. 23 is a diagram showing positions of three points in the artwork in the FIG. 22A and FIG. 22B frames of reference.

FIG. 23 shows distances d1, d2, d3, between these pairs of points. The task of alignment is to transform the captured image coordinate frame to match that of the reference, original coordinate frame, so that all three pairs of points are brought into alignment.

A conceptually-simple approach is to overlay the two coordinate frames at one starting alignment (e.g., with coincident origins), and compute the sum of the squared distances d1, d2 and d3. This serves as an error metric. Then adjust one of scale, rotation and translation between the two coordinate frames and recompute the error metric. If the error metric increases in value, the adjustment made things worse, and an adjustment in the opposite direction should be tried. If the adjustment reduces the error metric, the adjustment was an improvement, and a further adjustment of that sort can be tried. This is repeated until the error metric rises. At that point, another of rotation, scale and translation is adjusted, the error metric is recomputed, and the process continues. As the process continues, smaller adjustments are made, to hone-in on a best set of transform parameters that relates the two coordinate frames.

A more accurate procedure iterates six parameters: four affine parameters: scale, rotation, X-shear and Y-shear, together with X-translation and Y-translation.

Various particular arrangements can be employed to define the geometric transform that relates two planar coordinate spaces; the foregoing is simply exemplary. Appendix A is a detailed explanation of one particular method. (Yaniv, Point Based Rigid Registration.)

To use such methods, three points must be located in the two coordinate spaces. Again, various techniques can be used. One technique relies on algorithmically-located keypoints (sometimes termed "interest points," "feature points" or "corner points") within imagery. Various keypoint algorithms are known, such as SIFT and FAST. (SIFT is detailed in U.S. Pat. No. 6,711,293. FAST is detailed in Rosten, et al, Fusing points and lines for high performance tracking, 10th IEEE Int'l Conf. on Computer Vision, 2005, pp. 1508-1515, and Rosten, et al, Machine learning for high-speed corner detection, 2007 European Conference on Computer Vision, pp. 430-43, both of which are attached to application 62/487,678, filed Apr. 20, 2017.)

Figure 24:
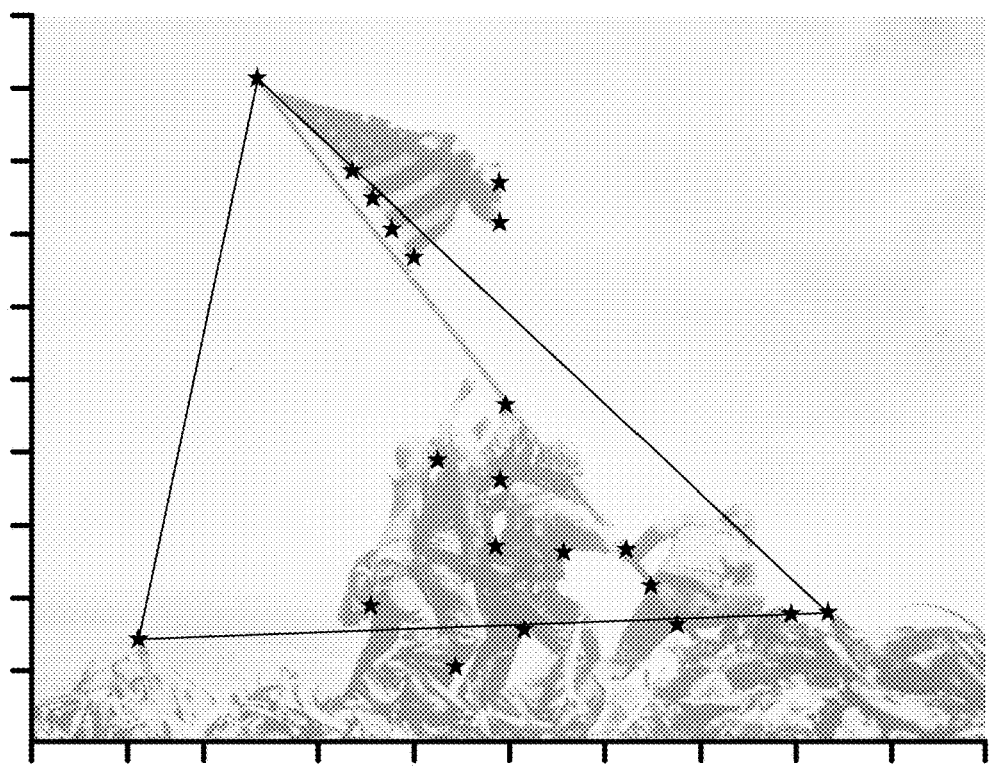
FIG. 24 illustrates how keypoints can be chosen, by which the original frame of reference, and the capture frame of reference, can be geometrically synchronized.

In an exemplary method, when the first computer system processes the input graphic artwork and the watermark pattern to yield pre-press artwork, it analyzes this final artwork to locate the 20 strongest keypoints within the imagery. An example is shown by the stars in FIG. 24. From these twenty keypoints, three are chosen: the point nearest the bottom left of the artwork, the point nearest the bottom right of the artwork, and the point nearest the top of the artwork. These three points define a large triangle that readily can be located in captured imagery.

Each of the three points is characterized by a lengthy descriptor string (e.g., 128 bits). Each point is also characterized by (x,y) coordinates within the reference coordinate space (i.e., the coordinate space of the original digital image produced by the first computer system). These three keypoint descriptors, and the three corresponding sets of coordinates, can be included in metadata accompanying the pre-press artwork, or stored in a cloud repository, to enable access by the second computer system.

With the descriptor information, the second computer system is able to locate the three keypoints within the scanner- or camera-captured artwork. It then iterates to find the six parameters (four affine transform parameters, plus X- and Y-translation), that places these three keypoints at their specified locations in the original, reference coordinate system. (In the present case the captured image is in a frame of reference that is 80% the scale of the original frame of reference, and is rotated 10 degrees counterclockwise from it. Of course, more complex transforms often occur.)

The scanner/camera-captured artwork is next mapped (resampled) back into the reference coordinate system, using the just-determined six parameters characterizing the transform between coordinate systems. Bilinear interpolation can be used to yield artwork values mapped from points in-between the scanner/camera capture points.

Once the scanner/camera-captured artwork is mapped back into the original reference frame, such imagery is then processed to simulate the heat shrinking, by applying the shrink-modeling transform information stored as metadata or in a cloud repository. A modified blend model is then applied (if the imaged sheet was printed by a proofing printer rather than the actual press), and a modified capture model is then applied, to yield a dataset simulating the imagery that will be captured from press-printed items using the anticipated camera system. Strength metrics are then determined—either across the sheet or at selected fidelity points. (Fidelity points are discussed in a separate section, below.)

Figure 25:
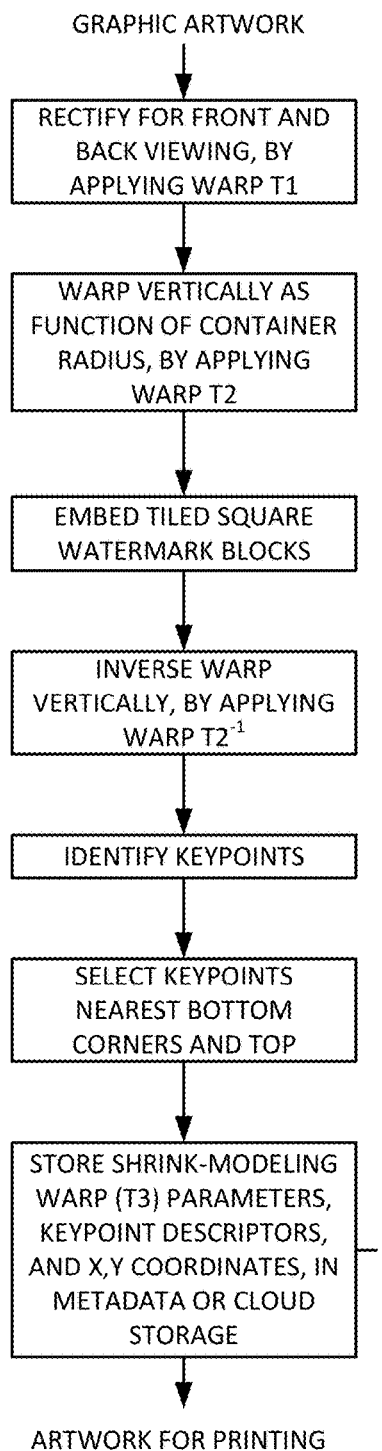
FIG. 25 illustrates a process including grading of a press sheet, including certain aspects of the detailed technology.
Figure 25:
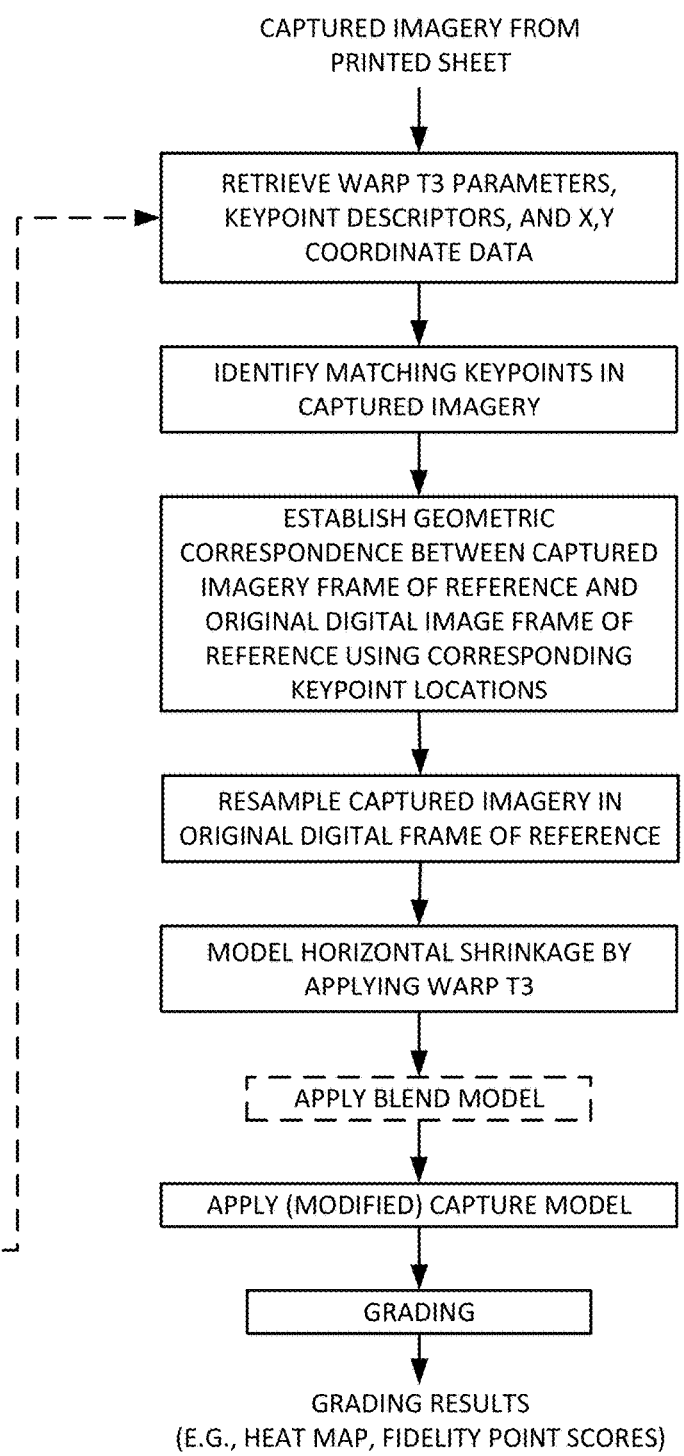

The just-described process is illustrated by the flowchart of FIG. 25. Like FIG. 21, this process starts from the process of FIG. 14. As before, the FIG. 25 process can be readily adapted to the alternative processes of FIG. 16, 17 or 18.

Pre-press artwork for shrink-fit sleeves typically is presented on a sheet that includes trim or die-cut lines, together with fiducials (e.g., crosshairs or bullseyes) and/or color press strips. In some embodiments such extra features that are found on the press sheet—but that aren't presented to the consumer as packaging artwork—are the features on which geometric synchronization of the captured imagery to the reference coordinate frame are based. Such features can be among those considered as keypoints in the just-described approach. Alternatively, they can be recognized in the captured printed artwork by the second computer system using appropriate pattern recognition techniques. (See, e.g., Calvet et al, Detection and Accurate Localization of Circular Fiducials Under Highly Challenging Conditions, 2016 IEEE Conf. on Computer Vision and Pattern Recognition, pp. 562-570.) The first computer knows the location of such features in the original image space from its composition of the digital pre-press artwork. The first computer system can include such location information as digital image metadata, or store it in a cloud repository. As before, the geometric transformation that maps these features from the captured image frame of reference into their original locations in the digital artwork frame of reference is the transformation that should be applied to the captured artwork prior to shrink-modeling and grading.

In still another embodiment, a patch of digital watermark pattern, in its unwarped state, is included on the press sheet outside the trim/die-cut lines, and is printed on the sheet by the proofing printer or press. The second computer system applies the first stage of watermark detection to determine, from this pattern, the affine transform with which the press sheet is depicted in the captured imagery. The X- and Y-translation of the transformed imagery is next established, e.g., by metadata or cloud-stored data indicating the X,Y position of the patch of watermark pattern on the press sheet. The captured imagery is then geometrically transformed, using the just-determined information, into the same geometric state as the original digital image data. Shrink-modeling and grading then follows.

Warping Non-Rectangular Artwork

Figure 26A:
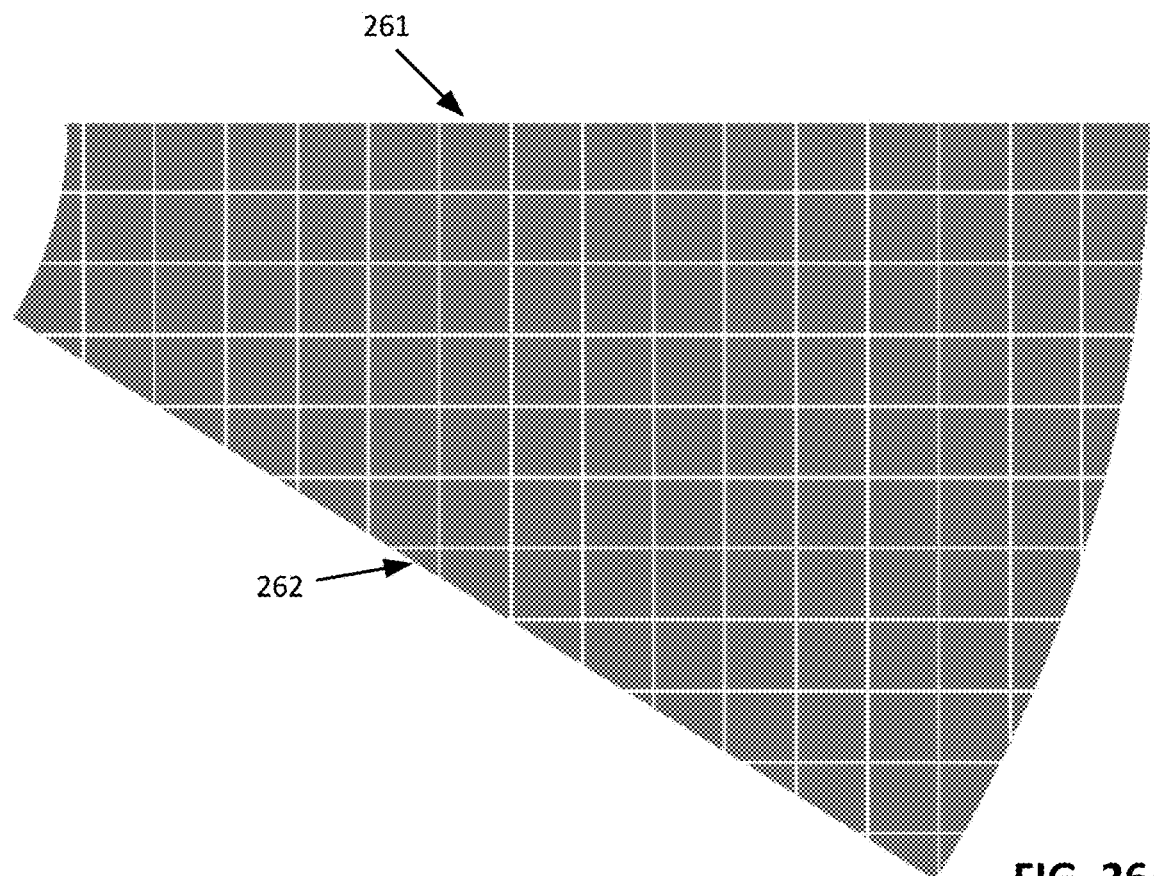
FIGS. 26A and 26B show two alternative ways of marking a sector of an annulus with an array of signal tiles.

The foregoing examples are illustrated with reference to a rectangular sheet of plastic that is printed with artwork including a watermark pattern, formed into a cylindrical sleeve, and heat-shrunk to a bottle. A different situation arises if the watermark-printed substrate is not, at some point, rectangular, yet wraps around a volume. Consider a plastic drinking cup having a tapered shape. The diameter at the top is larger than the diameter at the bottom. If unwrapped and laid flat, the sidewall has the shape of a sector of an annulus, e.g., as partially-represented by FIG. 26A. If a pattern of square watermark blocks spans such an annular sector, then at some point a troublesome pattern seam arises where the edges of the pattern meet. At this seam the partial blocks do not transition smoothly—each to the next. Instead, the pattern abruptly stops at one boundary 261 (defined by a line through the pattern at a first angle), and meets a second boundary 262 (defined by a line through the pattern at a second, different, angle). A trouble with such a seam is that a watermark detector—presented with imagery depicting such region of the cup—gets conflicting signals about the orientation of the watermark. Is it oriented as suggested by the signal on one side of the seam, or the other? Whichever decision is made, the imagery on the opposite side of the seam contributes nothing to the decoding operation—except possible confusion. Decoding suffers.

Figure 26B:
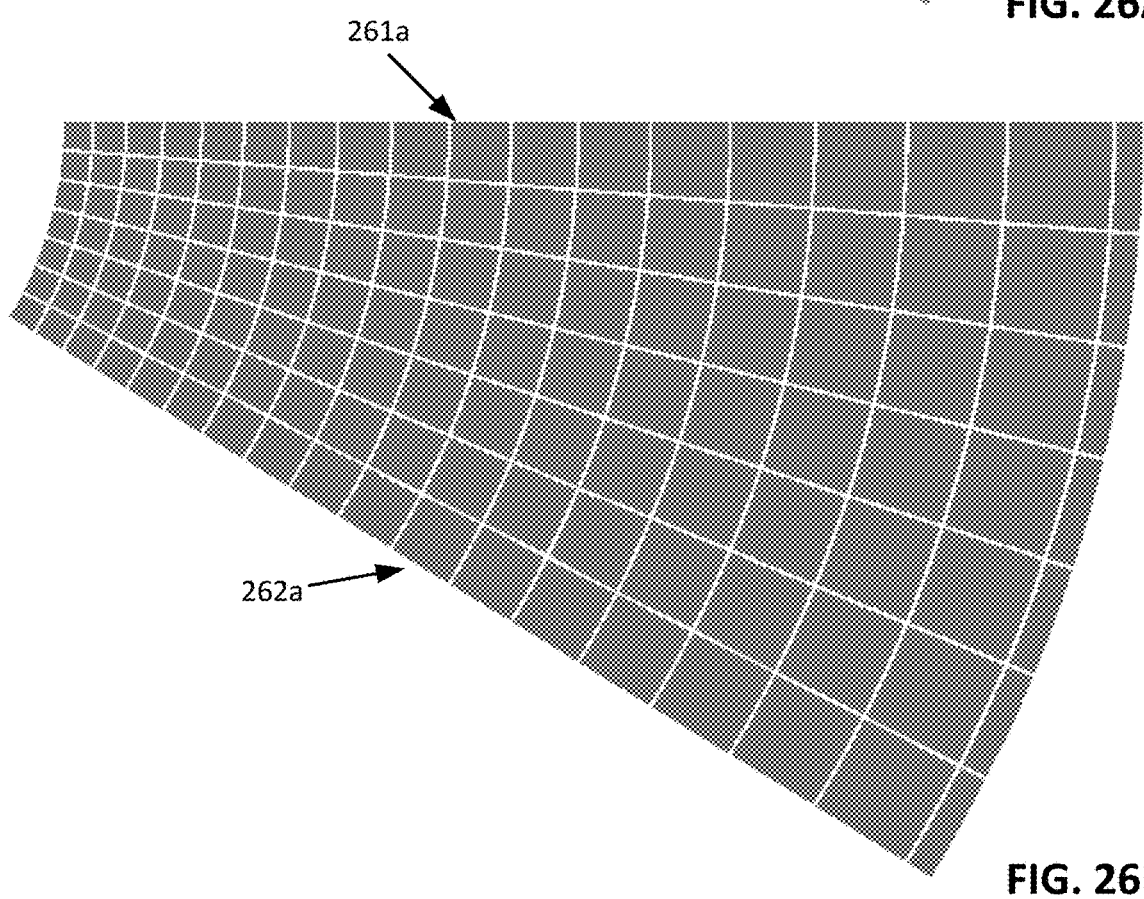

In such instances, it is preferable to apply a polar warp to the watermark signal blocks, as shown in FIG. 26B. Each square watermark block becomes a patch shaped as a sector of an annulus, with two straight sides and two curved sides (the straight sides being opposite each other). This enables the edges 261a, 262a, to seamlessly transition, provided that an integral number of watermark blocks is placed around the circumference. Such polar warping avoids the decoding difficulties of the FIG. 26A arrangement. The tradeoff is that the scale of the watermark varies, e.g., from 160 to 193 WPI in an exemplary cup, with a 10-degree taper. However, existing watermark detectors cope well with such ranges of scale state variations, and they likewise have been found to cope well with polar distortions of this magnitude.

The mapping between locations in a repeating watermark block, and locations in an annular sector, is detailed in the paper by Holub attached as an appendix to cited U.S. application 63/011,195.

While drink cups commonly do not include any graphic artwork, other tapered containers do (e.g., yogurt containers). The rectification principles detailed earlier can be applied to graphic artworks for such containers, to provide desired appearances when viewed from the front (and possibly the back) of the containers.

The methods detailed earlier are equally applicable in the case of tapered containers. Indeed, such methods are applicable whenever a graphic is warped in anticipation of human viewing, and warping of an included watermark pattern is also desired to improve readability. In the tapered container example, for example, the methods of FIGS. 14, 21 and 25 can again be used. Referring particularly to FIG. 21, the warp T1 is the warp needed to achieve a desired appearance of the graphic artwork on the tapered container for human viewers. The warp $T2^{-1}$ is the polar warp of the watermark pattern discussed above. The warp T2 is the inverse of this polar warp, so that the successive warping of the graphic artwork by transformations T1, $T2^{-1}$ and T2 leaves the graphic artwork warped by transformation T1 only, yet leaves the watermark pattern warped by the polar transformation.

Watermarking Technology

A brief review of watermarking principles, and particular methods, is presented below. Additional information is provided in the patent documents cited in this specification.

In an exemplary watermark encoding method, a plural-symbol message payload (e.g., 47 binary bits, which may represent a product's Global Trade Identification Number (GTIN), or a container identification code, together with 24 associated CRC bits), is applied to an error correction coder. This coder transforms the symbols of the message payload into a much longer array of encoded message elements (e.g., binary or M-ary elements) using an error correction method. (Suitable coding methods include block codes, BCH, Reed Solomon, convolutional codes, turbo codes, etc.) The coder output may comprise hundreds or thousands of binary bits, e.g., 1024, which may be termed raw signature bits. These bits may be scrambled by XORing with a scrambling key of the same length, yielding a scrambled signature.

Each bit of the scrambled signature modulates a pseudo-random noise modulation sequence (spreading carrier) of length 16, e.g., by XORing. Each scrambled signature bit thus yields a modulated carrier sequence of 16 "chips," producing an enlarged scrambled payload sequence of 16,384 elements. This sequence is mapped to elements of a square block having 128×128 embedding locations in accordance with data in a map or scatter table, yielding a 2D payload signature pattern comprised of 128×128 watermark elements ("waxels"). In a particular embodiment, the scatter table assigns 4 chips for each scrambled signature bit to each of four 64×64 quadrants in the 128×128 block.

Each location in the 128×128 block is associated with a waxel (chip) value of either 0 or 1 (or −1 or 1, or black or white)—with about half of the locations having each state. This bimodal signal is frequently mapped to a larger bimodal signal centered at an eight-bit greyscale value of 128, e.g., with values of 95 and 161. Each of these embedding locations may correspond to a single pixel, resulting in a 128×128 pixel watermark message block. Alternatively, each embedding location may correspond to a small region of pixels, such as a 2×2 patch, termed a "bump," resulting in a 256×256 pixel message block.

A synchronization component is commonly included in a digital watermark to help discern parameters of any affine transform to which the watermark has been subjected prior to decoding, so that the payload can be correctly decoded. A particular synchronization component takes the form of a reference signal comprised of a dozen or more 2D sinusoids of different frequencies and pseudorandom phases in the pixel (spatial) domain, which corresponds to a pattern or constellation of peaks of pseudorandom phase in the Fourier (spatial frequency) domain. Such alternate representations of an illustrative reference signal are shown in publication 20190306385 in FIG. 5C (pixel domain) and FIG. 6C (Fourier domain). As a matter of practice, this signal is commonly defined in the Fourier domain and transformed into the pixel domain at a size corresponding to that of the watermark message block, e.g., 256×256 pixels. This pixel reference signal, which may comprise floating-point values between −1 and 1, can be magnitude-scaled to a range of −40 to 40. Such reference signal elements are then combined with corresponding elements of the 256×256 pixel payload block to yield a final watermark signal block, e.g., having values ranging from 55 (i.e., 95-40) to 201 (i.e., 161+40). For print applications such signal can then be summed with host imagery, after first scaling-down in magnitude to render it inconspicuous.

If such a watermark signal block is rendered at a spatial resolution of 300 dots per inch (DPI), a signal block of about 0.85 inches square results. Since the 0.85 inch side dimension corresponds to 128 waxels, this works out to 150 waxels per inch. (Naturally, other sizes can be employed, e.g., 75, 200, 300 and 750 waxels per inch, etc.) Such blocks can be tiled edge-to-edge for marking a larger surface—in some cases spanning an object completely.

The just-described watermark signal may be termed a "continuous tone" watermark signal. In print it is often characterized by multi-valued data, i.e., not being just on/off (or I/O, or black/white)—thus the "continuous" moniker.

Each pixel of the host content (or region within the host content) is associated with one corresponding element of the watermark signal. A majority of pixels in a host image (or image region) are changed in value by combination with their corresponding watermark elements. The changes are typically both positive and negative, e.g., changing the local luminance of the imagery up in one location, while changing it down in another. And the changes may be different in degree—some pixels are changed a relatively smaller amount, while other pixels are changed a relatively larger amount. Typically, the amplitude of the watermark signal is low enough that its presence within the image escapes notice by casual viewers (i.e., it is steganographic).

(Due to the highly redundant nature of the encoding, some embodiments can disregard pixel changes in one direction or another. For example, one such embodiment only changes pixel values in a positive direction. Pixels that would normally be changed in a negative direction are left unchanged. The same approach can be used when a watermark is rendered as variations in the surface of a physical object, i.e., surface texturing, so that changes are made in one direction only.)

In a variant continuous tone print watermark, the signal acts not to change the local luminance of artwork pixels, but rather their color. Such a watermark is termed a "chrominance" watermark (instead of a "luminance" watermark). An example is detailed, e.g., in U.S. Pat. No. 9,245,308.

"Sparse" or "binary" watermarks are different from continuous tone watermarks. They do not change a majority of pixel values in the host image (or image region). Rather, they have a print density (which may sometimes be set by the user) that typically results in marking between about 3% and 45% of pixel locations in the image. Adjustments are usually all made in the same direction, e.g., reducing luminance. Sparse elements are commonly bitonal, e.g., being either white or black. Although sparse watermarks may be formed on top of other imagery, they are often presented in regions of artwork that are blank or colored with a uniform tone. In such cases a sparse marking may contrast with its background, rendering the marking visible to casual viewers. Although sparse marks can take the form of a field of seemingly-random dots, they can also take the form of line structures, as detailed elsewhere. As with continuous tone watermarks, sparse watermarks generally take the form of signal blocks that are tiled across an area of imagery.

A sparse watermark can be produced from a continuous-tone watermark in various ways. One is by thresholding. That is, the darkest elements of the summed reference signal/payload signal blocks are copied into an output signal block until a desired density of dots is achieved. Such a watermark may be termed a thresholded binary watermark.

Patent publication US20170024840 details various other forms of sparse watermarks. In one embodiment, a watermark signal generator starts with two 128×128 inputs. One is a payload signal block, with its locations filled with a binary (0/1, black/white) enlarged scrambled payload sequence, as described above. The other is a spatial domain reference signal block, with each location assigned a floating point number between −1 and 1. The darkest (most negative) "x"% of these reference signal locations are identified, and set to black; the others are set to white. Spatially-corresponding elements of the two blocks are ANDed together to find coincidences of black elements between the two blocks. These elements are set to black in an output block; the other elements are left white. By setting "x" higher or lower, the output signal block can be made darker or lighter. Such a code may be termed an ANDed, or a Type 1, binary watermark.

Publication US20190332840 details additional sparse encoding embodiments. One embodiment uses a reference signal generated at a relatively higher resolution (e.g., 384× 384 pixels), and a payload signal spanning a relatively lower resolution array (e.g., 128×128). The latter signal has just two values (i.e., it is bitonal); the former signal has more values (i.e., it is multi-level, such as binary greyscale or comprised of floating-point values). The payload signal is interpolated to the higher resolution of the reference signal, and in the process is converted from bitonal form to multi-level. The two signals are combined at the higher resolution (e.g., by summing in a weighted ratio), and a thresholding operation is applied to the result to identify locations of extreme (e.g., dark) values. These locations are marked to produce a sparse block (e.g., of 384×384). The threshold level establishes the dot density of the resulting sparse mark. Such a code may be termed an interpolated, or a Type 2, binary watermark.

A different embodiment orders samples in a block of a reference signal by value (darkness), yielding a ranked list of the darkest N locations (e.g., 1600 locations), each with a location (e.g., within a 128×128 element array). The darkest of these N locations may be always-marked in an output block (e.g., 400 locations, or P locations), to ensure the reference signal is strongly expressed. The others of the N locations (i.e., N—P, or Q locations) are marked, or not, depending on values of message signal data that are mapped to such locations (e.g., by a scatter table in the encoder). Locations in the sparse block that are not among the N darkest locations (i.e., neither among the P or Q locations) never convey watermark signal, and they are consequently affirmatively ignored by the decoder. By setting the number N larger or smaller, sparse marks with more or fewer dots are produced. This embodiment is termed the "fourth embodiment" in earlier-cited publication US20190332840, and may also be termed a Type 3 binary watermark.

In generating a binary (sparse) mark, a spacing constraint can be applied to candidate mark locations to prevent clumping. The spacing constraint may take the form of a keep-out zone that is circular, elliptical, or of other (e.g., irregular) shape. The keep-out zone may have two, or more, or less, axes of symmetry (or none). Enforcement of the spacing constraint can employ an associated data structure having one element for each location in the tile. As dark marks are added to the output block, corresponding data is stored in the data structure identifying locations that—due to the spacing constraint—are no longer available for possible marking.

In some embodiments, the reference signal can be tailored to have a non-random appearance, by varying the relative amplitudes of spatial frequency peaks, so that they are not all of equal amplitude. Such variation of the reference signal has consequent effects on the sparse signal appearance.

A sparse pattern can be rendered in various forms. Most straight-forward is as a seemingly-random pattern of dots. But more artistic renderings are possible, including Voronoi and Delaunay line patterns, and stipple patterns, as detailed in our patent publication US20190378235.

Other overt, artistic patterns conveying watermark data are detailed in patent publication US20190139176. In one approach, a designer creates a candidate artwork design or selects one from a library of designs. Vector art in the form of lines or small, discrete print structures of desired shape work well in this approach. A payload is input to a signal generator, which generates a raw data signal in the form of two-dimensional tile of data signal elements. The method then edits the artwork at spatial locations according to the data signal elements at those locations. When artwork with desired aesthetic quality and robustness is produced, it is applied to an object.

Other techniques for generating visible artwork bearing a robust data signal are detailed in assignee's patent publications US20190213705 and US20200311505. In some embodiments, a neural network is applied to imagery including a machine-readable code, to transform its appearance while maintaining its machine readability. One particular method trains a neural network with a style image having various features. (Van Gogh's The Starry Night painting is often used as an exemplary style image.) The trained network is then applied to an input pattern that encodes a plural-symbol payload. The network adapts features from the style image (e.g., distinctive colors and shapes) to express details of the input pattern, to thereby produce an output image in which features from the style image contribute to encoding of the plural-symbol payload. This output image can then be used as a graphical component in product packaging, such as a background, border, or pattern fill. In some embodiments, the input pattern is a watermark pattern, while in others it is a host image that has been previously watermarked.

Still other such techniques do not require a neural network. Instead, a continuous tone watermark signal block is divided into sub-blocks. A style image is then analyzed to find sub-blocks having the highest correlation to each of the watermark signal sub-blocks. Sub-blocks from the style image are then mosaicked together to produce an output image that is visually evocative of the style image, but has signal characteristics mimicking the watermark signal block. Yet another technique starts with a continuous tone watermark, divides it into sub-blocks, and combines each sub-block with itself in various states of rotation, mirroring and/or flipping. This yields a watermark block comprised of stylized sub-blocks that appear somewhat like geometrically-patterned symmetrical floor tiles.

Watermark reading has two parts: finding a watermark, and decoding the watermark.

In one implementation, finding the watermark (sometimes termed watermark detection) involves analyzing a received frame of captured imagery to locate the known reference signal, and more particularly to determine its scale, rotation, and translation.

The received imagery is desirably high-pass filtered so that the fine detail of the watermark code is maintained, while the low frequency detail of the item on which it is marked is relatively attenuated. Oct-axis filtering can be used.

In one oct-axis filtering arrangement, each pixel is assigned a new value based on some function of the original pixel's value relative to its neighbors. An exemplary embodiment considers the values of eight neighbors—the pixels to the north, northeast, east, southeast, south, southwest, west and northwest. An exemplary function sums a −1 for each neighboring pixel with a lower value, and a +1 for each neighboring pixel with a higher value, and assigns the resulting value to the central pixel. Each pixel is thus re-assigned a value between −8 and +8. (These values may all be incremented by 8 to yield non-negative values, with the results divided by two, to yield output pixel values in the range of 0-8.) Alternatively, in some embodiments only the signs of these values are considered—yielding a value of −1, 0 or 1 for every pixel location. This form can be further modified to yield a two-state output by assigning the "0" state, either randomly or alternately, to either "−1" or "1." Such technology is detailed in Digimarc's U.S. Pat. Nos. 6,580,809, 6,724,914, 6,631,198, 6,483,927, 7,688,996, 8,687,839, 9,544,516 and 10,515,429. (A variant filtering function, the "freckle" transform, is detailed in U.S. Pat. No. 9,858,681. A further variant, "oct-vector," is detailed in pending application Ser. No. 16/994,251, filed Aug. 14, 2020.)

In a recycling facility that captures images of waste items moving past on a conveyor, a watermark reading system may captured 300 frames per second of imagery. Each frame is high-pass filtered, and a few to a few hundred candidate blocks of filtered pixel imagery (commonly overlapping) are selected in an attempt to identify one or more watermarked items depicted in the image frame. (An illustrative embodiment selects 300 overlapping blocks.) Each selected block can have dimensions of the originally-encoded watermark block, e.g., 64×64, 128×128, 256×256, etc. We focus on the processing applied to a single candidate block, which is assumed to be 128×128 pixels in size.

To locate the watermark reference signal, the selected pixel block is first transformed into the Fourier domain, e.g., by a Fast Fourier Transform (FFT) operation. If a watermark is present in the selected block, the reference signal will be manifested as a constellation of peaks in the resulting Fourier magnitude domain signal. The scale of the watermark is indicated by the difference in scale between the original reference signal constellation of peaks, and the constellation of peaks revealed by the FFT operation on the captured, filtered imagery. Similarly, the rotation of the watermark is indicated by the angular rotation difference between the original reference signal constellation of peaks, and the constellation of peaks reveals on the FFT operation on the received, filtered imagery.

A direct least squares, or DLS technique is commonly used to determine these scale and rotation parameters, with each of a thousand or more candidate, or "seed," affine transformations of the known reference signal being compared to the magnitude data from the FFT transform of the input imagery. The parameters of the one or more seed affine transforms yielding FFT magnitude data that most nearly matches that of the block of filtered input imagery are iteratively adjusted to improve the match, until a final scale/rotation estimate is reached that describes the pose of the reference signal within the analyzed block of imagery.

Once the scale and rotation of the watermark within the received image block are known, the watermark's (x,y) origin (or translation) is determined. Methods for doing so are detailed in our U.S. Pat. Nos. 6,590,996, 9,959,587 and 10,242,434 and can involve, e.g., a Fourier Mellin transform, or phase deviation methods. (The just-noted patents also provide additional detail regarding the DLS operations to determine scale and rotation; they detail decoding methods as well.)

Once known, the scale, rotation and translation information (collectively, "pose" information) establishes a spatial relationship between waxel locations in the 128×128 watermark signal block, and corresponding locations within the captured image signal block. That is, one of the two signal blocks can be scaled, rotated and shifted so that each waxel location in the watermark code is spatially-aligned with a corresponding location in the captured image block.

Next, the original image data is geometrically transformed in accordance with the just-determined pose information and is resampled to determine image signal values at an array of 128×128 locations corresponding to the locations of the original 128×128 waxels. Since each waxel location typically falls between four pixel locations sampled by the camera sensor, it is usually necessary to apply bilinear interpolation to obtain an estimate of the image signal at the desired location, based on the values of the nearest four image pixels. The known reference signal has served its purposes at this point, and now just acts as noise, so it can be subtracted if desired. Oct-axis filtering is again applied. This yields a 128×128 waxel-registered array of filtered image data. From this data the watermark payload can be decoded.

In particular, the decoder examines the mapped locations for each of the 16 chips corresponding to a particular bit of the scrambled signature, and inverts each filtered image value—or not—in accordance with a corresponding element of the earlier-applied XOR spreading carrier. The resulting 16 values are then summed—optionally after each is weighted by a linear pattern strength metric (or grid strength metric) indicating strength of the reference signal in the watermark sub-block from which the value was sampled. (Suitable strength metrics are detailed in U.S. Pat. Nos. 10,217,182 and 10,506,128.) The sign of this sum is an estimate of the scrambled signature bit value—a negative value indicates −1, a positive value indicates +1. The magnitude of the sum indicates reliability of the estimated bit value. This process is repeated for each of the 1024 elements of the scrambled signature, yielding a 1024 element string. This string is descrambled, using the earlier-applied scrambling key, yielding a 1024 element signature string. This string, and the per-bit reliability data, are provided to a Viterbi soft decoder, which returns the originally-encoded payload data and CRC bits. The decoder then computes a CRC on the returned payload and compares it with the returned CRC. If no error is detected, the read operation terminates by outputting the decoded payload data, together with coordinates—in the image frame of reference—at which the decoded block is located (e.g., its center, or its upper right corner "origin"). (The payload data is then typically passed to a database to acquire attribute metadata corresponding to the item, including the type of plastic used. The coordinate data and metadata needed for sorting are passed to a sorting logic (diverter) controller. Metadata not needed for sorting but logged for statistical purposes are passed to a log file.)

In some embodiments, pose parameters are separately refined for overlapping sub-blocks within the 128×128 waxel block. Each waxel may fall into, e.g., four overlapping sub-blocks, in which case there may be four interpolated, filtered values for each waxel, each corresponding to a different set of pose parameters. In such case these four values can be combined (again, each weighted in accordance with a respective grid strength metric), prior to inversion—or not—in accordance with the corresponding element of the earlier-applied XOR spreading carrier.

Relatedly, once pose parameters for the image block are known, surrounding pixel data can be examined to see if the reference signal is present there too, with the same or similar pose parameters. If so, addition chip information can be gathered. (Since the watermark block is typically tiled, chip values should repeat at offsets of 128 waxels in vertical and horizontal directions.) Chip values from such neighboring locations can be weighted in accordance with the grid strength of the sub-block(s) in which they are located, and summed with other estimates of the chip value, to gain still further confidence.

In print, the different values of watermark elements are signaled by ink that causes the luminance (or chrominance) of the substrate to vary. In texture, the different values of watermark elements are signaled by variations in surface configuration that cause the reflectance of the substrate to vary. The change in surface shape can be, e.g., a bump, a depression, or a roughening of the surface.

Such changes in surface configuration can be achieved in various ways. For mass-produced items, molding (e.g., thermoforming, injection molding, blow molding) can be used. The mold surface can be shaped by, e.g., CNC or laser milling, or chemical or laser etching. Non-mold approaches can also be used, such as forming patterns on the surface of a container by direct laser marking.

Laser marking of containers and container molds is particularly promising due to the fine level of detail that can be achieved. Additionally, laser marking is well-suited for item serialization—in which each instance of an item is encoded differently.

In addition to the references cited elsewhere, details concerning watermark encoding and reading that can be included in implementations of the present technology are disclosed in applicant's previous patent filings, including U.S. patent documents U.S. Pat. Nos. 6,985,600, 7,403,633, 8,224,018, 10,958,807, and in pending application Ser. No. 16/823,135, filed Mar. 18, 2020. Further information about thermoforming (molding) of plastic items is detailed in published application 20210387399 and pending application 63/267,268, filed Jan. 28, 2022. Further information about injection molding is detailed in application Ser. No. 17/681,262, filed Feb. 25, 2022. Further information about laser marking of containers (which technology is also applicable to laser marking of molds) is detailed in published application 20210390358, and pending application 63/287,289, filed Dec. 8, 2021.

Fidelity Points

Fidelity points are helpful to determine whether a substrate is printed with sufficient robustness or encoding strength. Printers desire to know whether they have printed an encoded artwork correctly, so that the container performs according to expectations. Printers are familiar with an A-F grading system for 1D barcodes and desire something similar for other encoded signals, e.g., watermarks. Fidelity points are designed to provide a print quality control solution to determine whether a press has successfully reproduced an encoded signal from a digital artwork design, and to alert printers when there has been significant degradation of the encoded signal during printing. The term "significant" here indicates a potential non-detect situation. Consider the following definitions and descriptions to aid discussion.

Fidelity Points—Image areas that are selected to confirm whether an encoded design is printed with enough signal robustness so as to allow detection of its encoded signal. These areas can be selected in the digital realm prior to watermark pattern warping (e.g., when watermark blocks are square) and then corresponding areas on a printed version (after watermark pattern warping) are checked to determine robustness. In one example, fidelity points include a set of encoding block (tile) centers whose robustness in digital/unwarped form, and printed/copied/warped form, can be compared, thus providing a monitoring solution for a printed encoded signal at press. Detectability measure(s) can be used as a robustness indicator. Detectability measures can be determined from a digital design, while print-copy detectability measures can be determined from a captured image representing a printed substrate or container. In some embodiments, the set will include at least one tile member for each type of watermark encoding technique (e.g., cyan sparse dots, yellow sparse dots, Voronoi lines, continuous tone CMYK) used in a design. The set will also include at least one tile member for warps of different magnitudes and/or directions. In some embodiments, only a limited number of fidelity points are selected, precluding all encoding techniques and warps from being represented.

Fidelity Point Selection—This represents a process to select image areas to monitor for robustness. In one example, a set of encoded signal block (or tile) centers is selected from an encoded digital artwork prior to watermark warping, and corresponding detectability measure(s) are determined. Detectability measures can be determined, for example, as discussed in cited patents 10,789,438 and 11,250,535, including determining a message strength (MS) and/or Linear Reference Pattern Strength (LRPS).

Fidelity Point Confirmation—Confirm whether selected fidelity points achieve a predetermined detectability measure from a captured image. Such image is captured from a substrate from a proofing printer, or the actual press, before thermal-shrinking to a container. Thus, the warping that accompanies the thermal-shrinking must be modeled and applied to the captured imagery. Then, at determined locations corresponding to the selected fidelity points, corresponding detectability measure(s) are extracted and evaluated to see if they have significantly degraded. "Significant degradation" is defined as when a given fidelity point's detectability measure (e.g., a probability between 1 and 0, or 100 and 0) drops from $\geq 80$ (or 0.8) in a digital design, to $\leq 30$ (or 0.3) in an evaluation of a print sample. In another embodiment, a significant degradation occurs when a given fidelity point's detectability measure drops from $\geq 70$ (or 0.7) in a digital design, to $\leq 25$ (or 0.25) in an evaluation of a print sample. In still another embodiment, a significant degradation occurs when a given fidelity point's detectability measure drops from $\geq 60$ (or 0.6) in a digital design, to $\leq 20$ (or 0.20) in an evaluation of a print sample. Confirmation hopefully reveals that an encoded printed design has not significantly degraded.

Consider the Following Algorithms for Fidelity Point Selection:
1. Obtain a digital artwork file including one or more encoded watermark signals in un-warped form (i.e., comprised of square blocks). For example, in the flowchart of FIG. 14, such an artwork file can be obtained after step 142 and before step 143. The digital artwork file may include multiple instances of an encoded signal, e.g., tiled across an image or image area, and/or across multiple different color channels.
2. From this digital artwork file, select a set of watermark block or tile centers, and extract or determine their corresponding detectability measures, e.g., using a combination of the MS and LRPS metrics.
3. Group or "bin" together tiles having the same encoding technology. For example, tiles encoded with a black sparse mark are grouped in a first bin, while tiles with of a spot color encoding are grouped in a second bin (see, e.g., U.S. Pat. No. 10,270,936), and tiles encoded using cyan, magenta, yellow and/or black (CMY and/or K) are grouped in a third bin. The bins can be optionally refined further to represent different overprinting, colors, and/or tones. For example, "CMY encoding without K overprinting" and "CMY encoding with K overprinting" can be viewed as different encoding technologies, and be separately binned.
4. Determine which bins includes watermark tiles that will be warped differently, and divide them into separate bins. In the common case where the warping function is variable, such as illustrated by FIG. 15, exemplary warps may be chosen. In the FIG. 15 example, two extreme warps may be chosen (e.g., maximum vertical compression and minimal vertical compression), together with an intermediate warp, as indicated by the arrows of three different weights in the right margin. This may result in one bin for tiles encoded with a sparse black watermark pattern with a large vertical compression warp, tiles encoded with a sparse black watermark pattern with a small vertical compression warp, tiles encoded with a CMYK continuous pattern with a large vertical compression warp, etc.
4. For each bin, remove any tiles having a detectability measure below a predetermined threshold. For example, tiles having a detectability measure probability, combining a message strength and an orientation component strength, less than or equal to 0.79, or less than or equal to 0.69, or less than or equal to 0.59, are discarded. If a bin does not have any qualified tiles relative to the threshold, processing moves onto the next bin.
5. Within each bin, if multiple tiles remain, selection priority can be determined based on location. For example, tiles surrounded by peer tiles having the same type of encoding technology are prioritized higher than those without neighbors, or with fewer such neighbors. In another example, a tile that is centrally located within an image is prioritized over tiles located closer to artwork edges. If there are multiple tiles with the same neighbor weight (e.g., same number of neighbors), select the one with a lower detectability measure. While we preferably select only one tile per bin as a fidelity point, we can optionally select up to 5 tiles per bin. Alternatively, a total number of fidelity points is selected across all bins, e.g., only 3-11 bins despite the number of bins, and fidelity point selection stops once the total number is reached. In one example, 17 bins (or other number) are determined; yet, only 2-7 total fidelity points are allowed. A prioritization methodology to select the 2-7 total fidelity points is discussed below.
6. Spatially locate selected fidelity points relative to the encoded digital artwork. These spatial locations can be used to generate a press check sheet, which highlights fidelity point locations to be scanned by a mobile device, handheld scanner, inline scanner (e.g., an on-press scanner) or flatbed scanner. The press check sheet should correspond to the artwork after the watermark warping has been applied, as that is the appearance the tested sheet will take.

Bin Prioritization Algorithms
1. Optionally, prioritize bins with strongly warped watermark patterns. Such blocks have been subjected to more image processing than other blocks, providing more opportunities for issues to arise. Thus, these bins may be moved to the top of the list for processing.
2. Optionally, prioritize bins based on ink color. For example, if embedding background or white areas with so-called Digimarc Light inks (see, e.g., U.S. Pat. No. 10,445,849), related bins can be moved near the top of the list for processing. Bins associated with inks designated as important or otherwise likely to include encoding can be optionally prioritized highly.
3. Sort bins based on their tile counts in descending order. For example, five combinations of embedding techniques and warp strengths/directions may be used in an encoded artwork. The bin with the highest tile count spans more of the artwork area than any of the others, so may be given a priority than bins with lower tile counts.
4. If two or more bins have the same tile counts, use average detectability measures of qualified tiles from each bin to break the tie, and prioritize the one with the larger average above the ones with a smaller average.
5. Scan through the prioritized bin list selecting one fidelity point per bin until a target number of fidelity points has been selected (e.g., 2-9 tiles), or until threshold percentage of image area coverage is reached (e.g., 60%-100% image area coverage, preferably at least 80%). The selection process can repeat again if more fidelity points are allowed to be selected.

Tile Prioritization Algorithms:
1. For each bin in the sorted order, discard tiles whose detectability measures fall below a threshold. For example, discard those tiles falling below, 80%, 70% or 60%. Then sort remaining bin tiles by neighbor count in descending order. For example, top priority may be given to an unwarped continuous tone watermark tile printed with CMYK inks that has five similar neighboring tiles, then priority may be given to a strongly vertically-warped sparse watermark tile with three such neighbors, etc. If there is a tie, preference is given to the tile with the lowest strength, as it is the most likely to fail.
2. For so-call dual-bins, i.e., bins representing tiles that have more than one modulating ink, no fidelity point is normally selected from such a bin, as preference is given to tiles that have each color encoding independently (i.e., single-bin tiles). However, if no single-bin tile can be found for a particular encoding technique, then a dual-bin tile may be selected as a fidelity point.
3. If any bin does not have any tile meeting the detectability measure (e.g., all tiles in this bin have detectability measures <70%), move to the next bin.

Fidelity Point Confirmation

Once a substrate has been printed with an encoded signal, on a proofing printer or on the final press, fidelity point confirmation can be carried out to see if the encoded signal has significantly degraded, or whether the encoded signal remains detectable. In one embodiment, an RGB scan using an Epson V39 scanner is taken. Captured image data from at least the red channel is geometrically synchronized as described earlier, and warped to simulate the thermal shrinkage of the artwork onto the intended container (using warping parameters from metadata or cloud storage). Detectability measures are then determined at locations corresponding to previously selected fidelity points. To avoid false alarm (e.g., where an otherwise good print sample is falsely labeled "bad"), a fidelity point confirmation failure is only declared when there is a significant degradation in robustness compared to the earlier score obtained from the digital artwork. For example, if a detectability measure at a fidelity point in the printed object falls below 60%, or 40% of the detectability of the corresponding point in the digital artwork, then significant degradation is determined.

Concluding Remarks

Having described and illustrated the principles of our inventive work with reference to illustrative features and examples, it will be recognized that the technology is not so limited.

For example, while the focus has been on label artwork that is heat-shrunk to containers, it will be recognized that the principles are applicable wherever a watermark pattern is mapped to a surface that is not isometric to a plane.

While reference was made to a warping pattern that locally-compresses the watermark pattern in certain areas, it will be understood that the same benefits can also be achieved by a warping pattern that locally-expands certain areas. Relatedly, while vertical compression was described, it will be noted that horizontal compression, or other warping transformation, may be appropriate, depending on the application.

More generally, any process in which a printed surface is deformed in a manner resulting in asymmetrical scaling (e.g., shrinking or expanding), can employ principles of the present technology.

Relatedly, while the technology is illustrated with a curvoid container that is rotationally-symmetric around a vertical axis, the same principles can be applied to containers lacking such symmetry.

Often the degree and form of warping applied to pre-press artwork is left to the discretion of the pre-press artist, even if the warping is of a character that has a mathematical solution. For example, in warping a Nutrition Facts panel for the milk bottle of FIG. 8A, the warp may be mathematically defined based on the bottle shape so as to yield apparently perfectly vertical edges if viewed from a distance. However, the artist who prepared the label of FIG. 8B did not adopt such a mathematically-perfect warp. Based on, e.g., aesthetic considerations, the artist used a warp that still left some apparent curvature in the vertical sides of the Nutrition Facts panel, as can be seen on close inspection of FIG. 8A.

Although the detailed process for geometrically-registering a captured frame of imagery to an original frame of reference was described as employing three points, it will be understood that such process can—and often is—performed using more than three points.

While FIGS. 14, 21 and 25 show a warping process following a rectifying process, it will be understood that the rectifying process is itself a warping process, and that the two warping processes can be—and desirably are—combined into a single operation.

Fidelity points were described as being selected in the digital realm prior to watermark pattern warping (e.g., between steps 142 and 143 in FIG. 14). At this point they are all full-size, and not locally-compressed in accordance with container radius. In other embodiments the fidelity points are selected by taking the final artwork and applying the shrink-modeling warp to produce square watermark blocks, and then making selections from these blocks. By such approach the fidelity point metrics are based on the smaller watermark blocks that appear after heat-shrinking on small-radius parts of the container, rather than on watermark blocks that are full-sized across the container.

Although the specification describes the watermark as being read from a container in a recycling facility, it will be recognized that this usage scenario is exemplary and not limiting. For example, watermark data may be read from shaped containers in supermarket checkouts, or in warehouses or shipping facilities, etc.

In some embodiments, the digital file provided to the printer includes parameters defining the earlier-applied warps, to enable unwarping of some or all of the digital artwork or printed/scanned artwork for testing (e.g., to determine message strength and/or Linear Reference Pattern Strength). Alternatively, such parameters may be stored in a remote computer repository (cloud storage), and be associated with the artwork, for later retrieval and such use. (Such warping parameters may also be included in reports concerning the artwork, e.g., containing predicted or measured watermark robustness information.)

In some embodiments, an unwarped patch of artwork imagery can be included in the digital print file, and printed in the margin of the printed labels (e.g., outside die lines) so that it can be tested (e.g., to assess watermark strength metrics) without having to account for warping.

Relatedly, the digital artwork provided to the printer can also include one or more other files comprising unwarped artwork that can be printed, as by a test sheet, for such analysis. Alternatively, such other file(s) can be stored in a cloud repository and associated with the digital artwork, permitting the printer to download the associated file(s) to print and analyze test sheet(s) before the labels are printed.

Such further file(s) can also include artwork files annotated with markings to identify locations of fidelity points to the press operator. The operator can the analyze a test sheet of the label artwork by reference to imagery scanned from such locations. Alternatively, such file(s) can specify coordinate locations of the fidelity points for use by an automated system that examines a scanned test label sheet at the specified coordinates, and performs print grading (e.g., with strength metrics as above).

In some embodiments the printer produces a test sheet of the warped label graphic (or pulls a production sheet) and scans it. The scanned data is then provided to a software program which obtains the warping parameters from the cloud or from the media by which the digital print artwork was sent, and un-warps the scanned image. Robustness tests are then conducted on the un-warped scanned image data.

While the described watermarking technology employs a reference signal comprised of peaks in the Fourier magnitude domain, it should be recognized that reference signals can exhibit fixed features in different transform domains by which geometric synchronization can be achieved.

Relatedly, it is not necessary for a digital watermark signal to include a distinct reference signal for geometrical synchronization purposes. Sometimes the payload portion of the watermark signal, itself, has known aspects or structure that enables geometrical synchronization without reliance on a separate reference signal.

The term "watermark" commonly denotes an indicia that escapes human attention, i.e., is steganographic. While steganographic watermarks can be advantageous, they are not essential. As indicated, watermarks forming overt, human-conspicuous patterns, can be employed in embodiments of the present technology.

For purposes of this patent application, a watermark is a 2D code produced through a process that represents a message of N symbols using K output symbols, where the ratio N/K is less than 0.2. (In convolutional coding terms, this is the base rate, where smaller rates indicate greater redundancy, and thus greater robustness in conveying information through noisy "channels.") In preferred watermark embodiments the ratio N/K is 0.1 or less. Due to the small base rate, a payload can be decoded from a watermark even if half of more (commonly three-quarters or more) or the code is missing.

In a particular embodiment, 47 payload bits are concatenated with 24 CRC bits, and these 71 bits ("N") are convolutionally encoded at a base rate of $1/13$ to yield 924 bits ("K"). A further 100 bits of version data are appended to indicate version information, yielding the 1024 bits referenced earlier (which are then scrambled and spread to yield the 16,384 values in a 128×128 continuous tone watermark).

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a sparse watermark is typically a function of the synchronization signal. Again in contrast, synchronization in QR codes is achieved by alignment patterns placed at three corners and at certain intermediate cells. Message data is expressed at none of these locations.

In instances in which a shrink sleeve wraps a container, the container substrate may be printed or textured to encode a first payload, while the sleeve may be printed or textured to encode a second payload. The two payloads may be the same or different. If the same, the payload may indicate the plastic composition of the underlying container, and may additionally indicate the plastic composition of the sleeve. If different, the payloads may indicate the plastic composition of the plastic to which they are respectively applied. The reference signals used on the sleeve and on the substrate may be the same, or they may be different.

Shrink sleeves can be formed of various plastic and polyester materials. Polyethylene terephthalate glycol (PETG) is exemplary.

While the technology has been described in the context of digital watermarks, it will be recognized that any other machine-readable marking can be used, such as DotCode and dot peen markings (although certain benefits may be impaired). U.S. Pat. No. 8,727,220 teaches twenty different 2D codes that can be used in labeling plastic containers. If desired, an item may be marked with multiple instances of a watermark or other 2D code block, with random noise interspersed between the blocks (e.g., as in publication US20110240739).

Although reference is often made to watermark blocks that are square in shape, it will be recognized that printed or textured surfaces can likewise be tiled with watermark blocks of other shapes. For example, a hexagonal honeycomb shape may be composed of triangularly-shaped waxels.

Similarly, while repeated reference was made to watermark data encoded in a 128×128 waxel block, it will be recognized that such dimensions are exemplary. Larger or smaller blocks can naturally be used.

As reviewed above, watermark detection and synchronization in an exemplary embodiment employs a direct least squares (and phase deviation) approach. Other techniques, however, can also be used. One example is a coiled all-pose arrangement, as detailed in patent publication US20190266749. Another option is to use an impulse matched filter approach, (e.g., correlating with a template comprised of peaks), as detailed in U.S. patent documents U.S. Pat. Nos. 10,242,434 and 6,590,996.

The discussions involving sparse watermarks describe them as dark marks on a lighter background, but this is not essential. In other arrangements light marks on a darker background can be employed. In the case of thresholded binary watermarks, for example, a continuous tone watermark can be thresholded to identify the lightest elements of the watermark, and spatially-corresponding white elements can be copied into a dark signal block until a desired density of dots is achieved. Similarly, while applicant generally follows a practice in which smaller signal levels correspond to darker marks, the opposite practice can naturally be used. More generally, the light/dark conventions observed in the detailed embodiments are not essential but are merely exemplary, with inverted arrangements being similarly possible, as will be recognized by the artisan.

In some embodiments imagery is locally inverted on a patchwork basis to counteract specular reflection inversion prior to watermark decoding. Such work is detailed in U.S. patent application Ser. No. 17/687,247, filed Mar. 4, 2022.

From the foregoing examples it will be recognized that the earlier-detailed embodiments of our inventive work are exemplary only, and that the technology is not so limited.

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The methods and algorithms detailed above can be implemented in a variety of different hardware processors, including a microprocessor, an ASIC (Application Specific Integrated Circuit) and an FPGA (Field Programmable Gate Array). Hybrids of such arrangements can also be employed.

By microprocessor, applicant means a particular structure, namely a multipurpose, clock-driven integrated circuit that includes both integer and floating point arithmetic logic units (ALUs), control logic, a collection of registers, and scratchpad memory (aka cache memory), linked by fixed bus interconnects. The control logic fetches instruction codes from an external memory, and initiates a sequence of operations required for the ALUs to carry out the instruction code. The instruction codes are drawn from a limited vocabulary of instructions, which may be regarded as the microprocessor's native instruction set.

A particular implementation of one of the above-detailed processes on a microprocessor—such as discerning affine pose parameters from a watermark reference signal in captured imagery, or decoding watermark payload data—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangement allows multiple operations to be executed in parallel. (Some elements—such as the bus structure and cache memory may be shared between the cores.)

Examples of microprocessor structures include the Intel Xeon, Atom and Core-I series of devices, and various models from ARM and AMD. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data. Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to discern affine pose parameters from a watermark reference signal, and programmed tomorrow to prepare a user's tax return, an ASIC structure does not have this flexibility. Rather, an ASIC is designed and fabricated to serve a dedicated task. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of watermark detectors and decoders offer higher performance, and consume less power, than implementations employing microprocessors. A drawback, however, is the significant time and expense required to design and fabricate circuitry that is tailor-made for one particular application.

A particular implementation of any of the above-referenced processes using an ASIC, e.g., for discerning affine pose parameters from a watermark reference signal in captured imagery, or decoding watermark payload data, again begins by defining the sequence of operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, an external memory. By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included. Likewise with A/D and D/A converters. Again, the reconfigurable interconnect that characterizes FPGAs enables such additional elements to be incorporated at desired locations within a larger circuit.

Examples of FPGA structures include the Stratix FPGA from Intel, and the Spartan FPGA from Xilinx.

As with the other hardware structures, implementation of the above-detailed processes on an FPGA begins by describing a process in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Still another type of processor hardware is a neural network chip, e.g., the Intel Nervana NNP-T, NNP-I and Loihi chips, the Google Edge TPU chip, and the Brainchip Akida neuromorphic SOC.

Software instructions for implementing the detailed functionality on the selected hardware can be authored by artisans without undue experimentation from the descriptions provided herein, e.g., written in C, C++, Visual Basic, Java, Python, Tcl, Perl, Scheme, Ruby, Caffe, TensorFlow, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: tc.al device, remote device, in the cloud, distributed, etc.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited documents. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc. For example, in FIG. 21, the steps 215, 216, 217 may instead be performed in the sequence 215-217-216, or 216-215-217, or 216-217-15, or 217-215-216, or 217-216-215. Other models may be introduced, e.g., to predict appearance of the watermarked object under particular spectra of expected illumination. And two or more models may be combined rather than being applied separately. Etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the technology.

The invention claimed is:

1. A method comprising the acts:

warping a 2D graphic artwork with a first warp, in anticipation of distortion when said artwork is later applied to a curvoid object, said warping the 2D graphic artwork yielding a warped 2D graphic artwork;

warping a 2D machine-readable code pattern with a second, different warp, in anticipation of distortion when said code pattern is later applied to said curvoid object, said warping the 2D machine-readable code pattern yielding a warped 2D machine-readable code pattern; and applying both the 2D warped graphic artwork and the warped 2D machine-readable code pattern to said curvoid object;

wherein warping applied to the 2D graphic artwork is different than warping applied to the 2D machine readable code pattern.

2. The method of claim 1 in which the curvoid object has a front, wherein warping the 2D graphic artwork with the first warp includes warping to rectify the 2D graphic artwork for front viewing on the curvoid object.

3. A method comprising the acts:

warping a 2D graphic artwork with a first warp, in anticipation of distortion when said artwork is later applied to a curvoid object, said warping the 2D graphic artwork yielding a warped 2D graphic artwork;

warping a 2D machine-readable code pattern with a second warp, in anticipation of distortion when said code pattern is later applied to said curvoid object, said warping the 2D machine-readable code pattern yielding a warped 2D machine-readable code pattern; and applying both the warped 2D graphic artwork and the warped 2D machine-readable code pattern to said curvoid object;

wherein warping applied to the 2D graphic artwork is different than warping applied to the 2D machine readable code pattern, in which the 2D machine-readable code pattern comprises a 2D array of elements extending in first and second orthogonal directions, wherein warping the machine readable code pattern with the second warp includes locally compressing or expanding scale of said elements in the first direction by differing amounts.

4. The method of claim 3 wherein warping the machine-readable code pattern with the second warp preserves scale of said elements in the second direction.

5. A method comprising the acts:

warping a 2D graphic artwork with a first warp, in anticipation of distortion when said artwork is later applied to a curvoid object, said warping the 2D graphic artwork yielding a warped 2D graphic artwork;

warping a 2D machine readable code pattern with a second warp, in anticipation of distortion when said code pattern is later applied to said curvoid object, said warping the 2D machine-readable code pattern yielding a warped 2D machine-readable code pattern; and applying both the warped 2D graphic artwork and the warped 2D machine-readable code pattern to said curvoid object;

wherein warping applied to the graphic artwork is different than warping applied to the machine-readable code pattern; and embedding the 2D machine-readable code pattern in the 2D graphic artwork after said 2D graphic artwork has been warped, said embedding yielding embedded artwork, and then applying a further warp to the embedded artwork.

6. A method comprising the acts:

applying a first warp to graphic artwork to rectify the graphic artwork for front viewing when the graphic artwork is later applied to a curvoid object, said apply a first warp yielding warped artwork;

embedding a 2D code pattern in the warped artwork, said embedding yielding embedded artwork;

applying a second warp, different than the first warp, to the embedded artwork, yielding artwork for printing;

providing said artwork for printing to a printer; and applying a further warp to said graphic artwork before said embedding, wherein said further warp and said second warp are inverses.

7. The method of claim 6 that includes applying said first warp and said further warp as a combined warp.

* * * * *